US009333529B2

(12) United States Patent
Zettsu et al.

(10) Patent No.: US 9,333,529 B2
(45) Date of Patent: May 10, 2016

(54) DEVICE FOR PRODUCING PARTICLE FILM AND METHOD FOR PRODUCING PARTICLE FILM

(75) Inventors: Nobuyuki Zettsu, Osaka (JP); Kazuya Yamamura, Osaka (JP); Kyohei Manabe, Osaka (JP)

(73) Assignee: OSAKA UNIVERSITY, Osaka (JP)

( * ) Notice: Subject to any disclaimer, the term of this patent is extended or adjusted under 35 U.S.C. 154(b) by 959 days.

(21) Appl. No.: 13/201,017

(22) PCT Filed: Feb. 16, 2010

(86) PCT No.: PCT/JP2010/000933
§ 371 (c)(1),
(2), (4) Date: Aug. 11, 2011

(87) PCT Pub. No.: WO2010/092836
PCT Pub. Date: Aug. 19, 2010

(65) Prior Publication Data

US 2011/0315052 A1 Dec. 29, 2011

(30) Foreign Application Priority Data

Feb. 16, 2009 (JP) ................................ 2009-033063

(51) Int. Cl.
*B05C 9/12* (2006.01)
*B05C 11/00* (2006.01)
*B05C 3/00* (2006.01)
*B05D 5/00* (2006.01)
(Continued)

(52) U.S. Cl.
CPC ... *B05D 1/00* (2013.01); *B05C 9/12* (2013.01); *B05D 2252/04* (2013.01); *B05D 2401/32* (2013.01)

(58) Field of Classification Search
None
See application file for complete search history.

(56) References Cited

U.S. PATENT DOCUMENTS 4,911,950 A 3/1990 Horikoshi et al.
5,270,079 A 12/1993 Bok
5,654,041 A * 8/1997 Appich et al. ............ 427/434.5
(Continued)

FOREIGN PATENT DOCUMENTS

EP 0640406 A1 3/1995
FR 1537039 A 8/1968
(Continued)

OTHER PUBLICATIONS

European Search Report mailed Apr. 15, 2013, EP Patent Application No. 10741116.7.
(Continued)

*Primary Examiner* — Dah-Wei D Yuan
*Assistant Examiner* — Jethro M Pence
(74) *Attorney, Agent, or Firm* — Casimir Jones, SC

(57) ABSTRACT

An apparatus (20) for producing a particle film according to the present invention is an apparatus for producing a particle film by sweeping a meniscus area (5) in a particle dispersion liquid (4) filling a space between a first substrate (1) and a second substrate (2) facing the first substrate (1) and by forming the particle film on the first substrate (1) while evaporating a solvent in the meniscus area (5), including: particle concentration measuring means (3) for measuring a concentration of particles in the meniscus area (5); and particle concentration adjusting means (13) for adjusting the concentration of particles in the meniscus area (5) in accordance with the particle concentration measured by the particle concentration measuring means (3).

4 Claims, 15 Drawing Sheets

(51) Int. Cl.
*C09D 1/00* (2006.01)
*B05D 1/00* (2006.01)

(56) References Cited

U.S. PATENT DOCUMENTS

| | | | | |
|---|---|---|---|---|
| 6,770,330 | B2 | 8/2004 | Nagayama et al. | |
| 2002/0015792 | A1 | 2/2002 | Nagayama | |
| 2002/0118005 | A1* | 8/2002 | Reich et al. | 324/71.4 |
| 2002/0182336 | A1 | 12/2002 | Nagayama | |
| 2003/0203103 | A1 | 10/2003 | Nagayama | |

FOREIGN PATENT DOCUMENTS

| | | |
|---|---|---|
| JP | H06-234219 | 8/1994 |
| JP | 088-010675 | 1/1996 |
| JP | H08-010675 | 1/1996 |
| JP | 2000-225372 | 8/2000 |
| JP | 2010-155218 | 7/2010 |
| WO | 2008/014604 A1 | 2/2008 |

OTHER PUBLICATIONS

Dimitrov, Antony S., "Continuous Convective Assembling of Fine Particles into Two-Dimensional Arrays on Solid Surfaces," Langmuir (1996), 12, pp. 1303-1311.

Gong, Tieying, et al., "Two-Dimensional Electrohydrodynamically Induced Colloidal Phases," Langmuir (2002), vol. 18, pp. 10064-10067.

Hayward, R.C., et al., "Electrophoretic assembly of colloidal crystals with optically tunable micropatterns," Nature, vol. 404, pp. 56-59 (2000).

Manabe, K., et al., "Development of the horizontal drive controlled nano-coater for making single layer of densely-packed polymeric nanoparticle arrays," The first international symposium on Atomically Controlled Fabrication Technology Abstract, pp. 128-129 (Feb. 16, 2009).

Tsutsui, Gen, et al., "Well-size-controlled Colloidal Gold Nanoparticles Dispersed in Organic Solvents," Japanese Journal of Applied Physics (2001), vol. 40, pp. 346-349.

English Translation of International Search Report mailed May 25, 2010 from parent International Patent Application No. PCT/JP2010/000933.

Manabe, K., et al., "Fabrication of the large-sized single crystalline film of nanoparticles in two dimensional through directed self-assembly approaches (4)", Fall 2008 Conference of the Japan Society for Precision Engineering, Proceedings of the Regularly-scheduled Academic Lecture Meeting in the Kansai Area, pp. 65-66, published on Jul. 22, 2008 (Partial English Translation Attached).

Manabe K., et al., "Fabrication of the large-sized single crystalline film of nanoparticles in two dimensional through directed self-assembly approaches (5)", Fall 2008 Conference of the Japan Society for Precision Engineering, Proceedings of the Academic Lecture Meeting, pp. 689-690, published on Sep. 17, 2008 (Partial English Translation Attached).

Manabe K., et al., "Fabrication of the large-sized single crystalline film of nanoparticles in two dimensional through directed self-assembly approaches (6)", Spring 2009 Conference of the Japan Society for Precision Engineering, Proceedings of the Academic Lecture Meeting, pp. 729-730, published on Mar. 17, 2009 (Partial English Translation Attached).

* cited by examiner

DEVICE FOR PRODUCING PARTICLE FILM AND METHOD FOR PRODUCING PARTICLE FILM

CROSS-REFERENCE TO RELATED APPLICATION

The present application is a U.S. §371 national phase entry of pending International Patent Application No. PCT/JP2010/000933, International Filing Date Feb. 16, 2010, which claims priority to Japanese Patent Application No. 2009-033063, filed Feb. 16, 2009, the contents of which are incorporated by reference in their entireties.

TECHNICAL FIELD

The present invention relates to a method for producing a particle film and an apparatus for producing a particle film, which apparatus can be suitably used for such a method for producing a particle film.

BACKGROUND ART

Conventionally, an advective accumulation method has been known as a method for accumulating fine particles two-dimensionally or three-dimensionally at a high density on a substrate. The advective accumulation method is a method for dipping, in a dispersion liquid of particles dispersed for a long period of time in a solvent such as an aqueous solution, a flat substrate, such as glass, which has a strong affinity for the solvent and thereby producing a particle film on the substrate. This method achieves high-density accumulation of the particles through utilization of autonomous accumulating force of the particles at the interface between the substrate and the dispersion liquid. A dip coater has been mainly used so far for the formation a particle film by the advective accumulation method (e.g., see Non-patent Literature 1).

With a dip coater, a fine-particle film is formed on a substrate by, after dipping the substrate in a fine-particle dispersion liquid, withdrawing the substrate from the fine-particle dispersion liquid at a given speed. It should be noted here that during the withdrawal of the substrate from the fine-particle dispersion liquid, there appears a meniscus between the substrate and the fine-particle dispersion liquid, whereby the nanoparticles are supplied toward the edge of the meniscus by a liquid current and capillary force. Because the solvent evaporates in the meniscus area, a decrease in thickness of the liquid film in relation to the film thickness of the particle film causes liquefaction bridging force between the particles, whereby the nanoparticles are immobilized on a surface of the substrate.

Further, there have been reports on a method for producing a particle film by a polystyrene particle dispersion liquid with use of a horizontally-driven nanocoater (e.g., see Non-patent Literatures 2 and 3). Specifically, there is disclosed a method for forming a particle film by inclining a second substrate at 0.14° to a first substrate, interposing therebetween a suspension containing nanoparticles, and moving only the first substrate in a horizontal direction.

CITATION LIST

Non-Patent Literature 1

Homepage of the Eintesla's website, searched on Dec. 24, 2008, Internet <URL: http://www.eintesla.om/products/dip/array.html>.

Non-Patent Literature 2

Fall 2008 Conference of the Japan Society for Precision Engineering, Proceedings of the Regularly-scheduled Academic Lecture Meeting in the Kansai Area, page 65, published on Jul. 22, 2008.

Non-Patent Literature 3

Fall 2008 Conference of the Japan Society for Precision Engineering, Proceedings of the Academic Lecture Meeting, page 689, published on Sep. 17, 2008.

SUMMARY OF INVENTION

Technical Problem

However, the method of Non-patent Literature 1 has difficulty in forming a particle film on a substrate of a practical size with a high degree of accuracy.

Specifically, the method has difficulty in forming a particle film uniformly on a substrate of a practical size, because the density in the same plane of the particle film to be formed becomes nonuniform due to disturbances such as changes in temperature and humidity in working conditions.

Further, although the method of Non-patent Literatures 2 and 3 can form a particle film even on a substrate of a practical size, it is necessary to form a particle film more uniformly.

The present invention has been made in view of the foregoing problems, and it is an object of the present invention to provide a method for producing a particle film and an apparatus for producing a particle film, which method and apparatus can form a particle film uniformly even on a substrate of a practical size.

Solution to Problem

In order to attain the foregoing object, the inventors of the present invention diligently studied a method for forming a particle film uniformly even on a substrate of a practical size. In the result, supposing that a monoparticle film is formed at a high density when an increased volume of a particle film per unit time and a volume of particles supplied from the meniscus area per unit time are equal, the inventors hypothesized that the coverage of a particle film is depends on the speed at which the substrate moves and the concentration of particles in the dispersion liquid. Moreover, based on the hypothesis, the inventors found that a particle film can be formed uniformly on a substrate of a practical size by suppressing changes in concentration of particles in the meniscus area. Thus, the inventors accomplished the present invention.

That is, in order to attain the foregoing object, an apparatus for producing a particle film according to the present invention is an apparatus for producing a particle film by sweeping a meniscus area in a particle dispersion liquid filling a space between a first substrate and a second substrate facing the first substrate and by forming the particle film on the first substrate while evaporating a solvent in the meniscus area, the apparatus including: particle concentration measuring means for measuring a concentration of particles in the meniscus area; and particle concentration adjusting means for adjusting the concentration of particles in the meniscus area in accordance with the particle concentration measured by the particle concentration measuring means.

According to the foregoing configuration, since the particle concentration adjusting means adjusts the concentration of particles in the meniscus area in accordance with the particle concentration measured by the particle concentration measuring means, it is possible to form a film while adjusting the concentration of particles in the meniscus area so that the concentration of particles in the meniscus area takes on a constant value. This brings about an effect of making it possible to form a particle film uniformly even on a substrate of a practical size.

That is, in order to attain the foregoing object, a method for forming a particle film according to the present invention is a method for producing a particle film by sweeping a meniscus area in a particle dispersion liquid filling a space between a first substrate and a second substrate facing the first substrate and by forming the particle film on the first substrate while evaporating a solvent in the meniscus area, the method including the steps of: (a) measuring a concentration of particles in the meniscus area; and (b) adjusting the concentration of particles in the meniscus area in accordance with the particle concentration measured in step (a).

According to the foregoing method, since step (b) adjusts the concentration of particles in the meniscus area in accordance with the particle concentration measured by in step (a), it is possible to form a film while adjusting the concentration of particles in the meniscus area so that the concentration of particles in the meniscus area takes on a constant value. This brings about an effect of making it possible to form a particle film uniformly even on a substrate of a practical size.

Furthermore, in order to attain the foregoing object, a particle film according to the present invention is produced by the method for producing a particle film according to the present invention, the particle film having an accumulation density controlled uniformly in a whole area of the particle film formed.

The foregoing configuration makes it possible to provide a particle film having an accumulation density controlled uniformly in a whole area of the particle film formed.

Advantageous Effects of Invention

An apparatus for producing a particle film according to the present invention brings about an effect of making it possible to form a particle film uniformly even on a substrate of a practical size.

Further, a method for producing a particle film according to the present invention brings about an effect of making it possible to form a particle film uniformly even on a substrate of a practical size.

DESCRIPTION OF EMBODIMENTS

Figure 1:
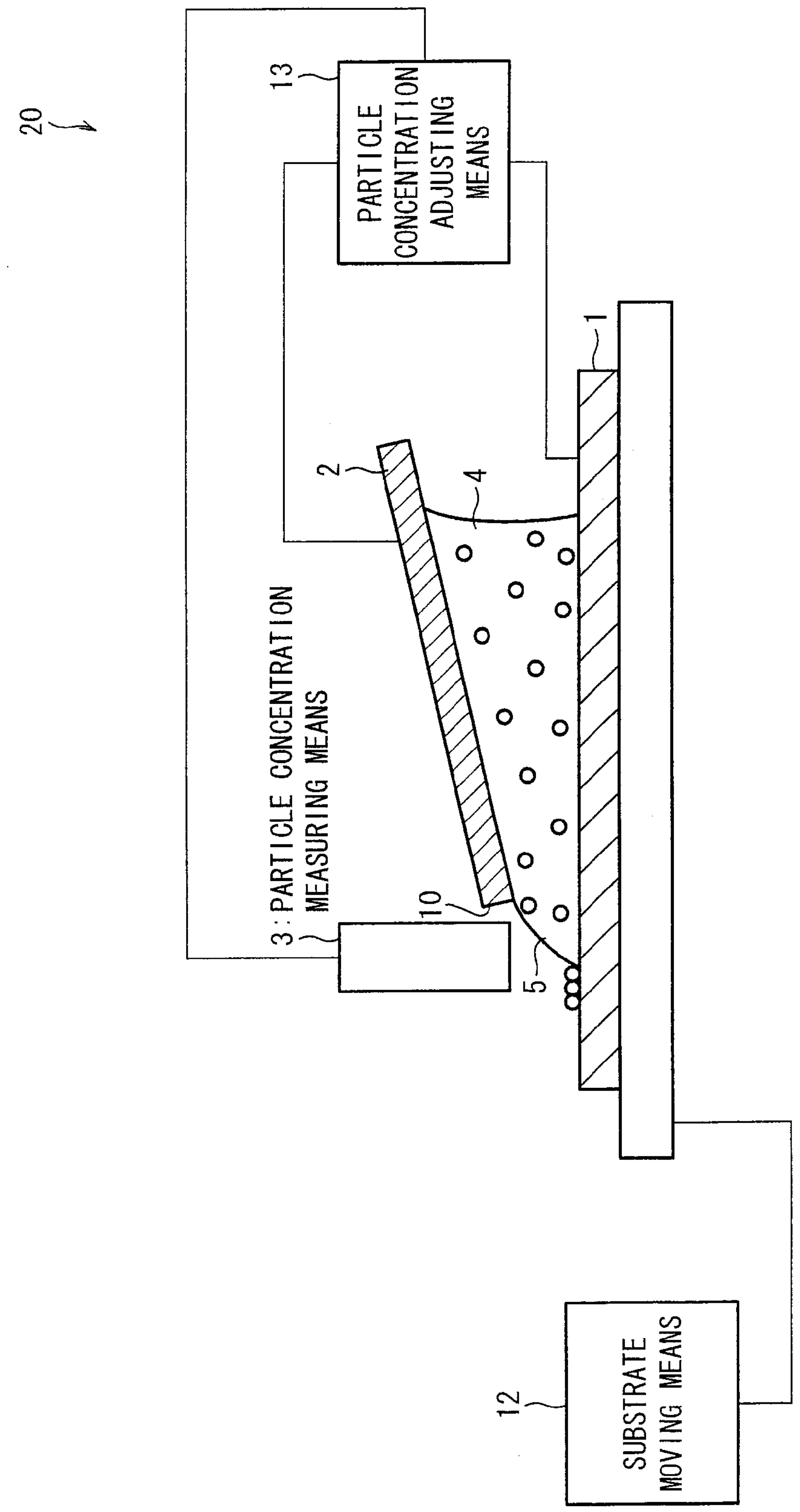
FIG. 1 is a cross-sectional view schematically showing an example of an apparatus for producing a particle film according to the present embodiment.

An embodiment of the present invention is described below.

It should be noted that the range of "A to B" here means a range of not less than A to not greater than B.

(I) Method for Measuring a Particle Concentration

A method for measuring a particle concentration according to the present embodiment, included in a method for forming a particle film on a substrate by, while changing the position of a substrate in relation to a particle dispersion liquid with the substrate in contact with the particle dispersion liquid, evaporating the solvent in a meniscus area in the particle dispersion liquid with the meniscus area appearing on the substrate, is a method for measuring a concentration of particles in the meniscus area.

The method for measuring a particle concentration according to the present embodiment includes (i) measuring capacitance in an area including the meniscus area and (ii) determining a particle concentration in accordance with the capacitance.

The method for forming a particle film on a substrate, to which the method for measuring a particle concentration according to the present embodiment can be applied, is an advective accumulation method and, specifically, the method for measuring a particle concentration according to the present embodiment can be applied to a method using a dip coater or a method for forming a film by filling a space between two such substrates as those described later with a particle dispersion liquid and moving either of the substrates.

The capacitance of the particle dispersion liquid can be measured by measuring the capacitance formed between a sensor probe (hereinafter sometimes abbreviated simply as "probe") and the substrate, for example, in a case where the substrate has electrical conductivity. Specifically, the capacitance of the particle dispersion liquid can be measured by grounding the first substrate, placing a probe of a capacitance meter so that the probe faces that surface of the first substrate on which a meniscus has appeared, and measuring capacitance between the probe and the first substrate.

Alternatively, in a case where the substrate has no electrical conductivity, the capacitance of the particle dispersion liquid can be measured by using such a probe that capacitance is formed within the probe. For example, with a KLA-Tencor's proprietary probe (marketed as "2810") or the like, active utilization of broadening of an electric field allows measurement of capacitance between the probe and the substrate. In this case, by placing the probe and the substrate at a distance of 1 mm or shorter, the same level of sensitivity can be obtained as in the case where the substrate has electrical conductivity.

An object whose capacitance is to be measured is not particularly limited, provided that it is an area in the meniscus that includes the particle dispersion liquid. It is possible to measure only capacitance in the meniscus area (which is an area composed of the particle dispersion liquid and an air layer between the dispersion liquid and the probe). Alternatively, it is possible to measure capacitance in a combination of the meniscus area and an area composed of the particle dispersion liquid, the second substrate, and an air layer between the second substrate and the probe.

It is preferable that the probe be placed in such a position as to cover almost all of the meniscus area. In so doing, it is preferable that the probe be in such a position not to overlap the nanoparticle single layer film area that has been formed. If these conditions are met, part of the probe may overlap the second substrate in the case of formation of a film with use of the after-mentioned two substrates. Alternatively, in a case where the aforementioned KLA-Tencor's probe is used, changes in nanoparticle concentration can be satisfactorily measured in any position in which the probe has been placed, provided that the distance between the tip of the probe and the substrate is 1.5 mm or shorter.

From the point of view of measuring, with high resolution, changes in capacitance due to changes in nanoparticle concentration, it is preferable that the probe be placed in close proximity to the substrate. Specifically, in the case of formation of a film from a comparatively low-dielectric material such as fine polymer particles, it is preferable that the distance between the probe and the substrate be set within a range of not less than 200 μm to not greater than 3,000 μm or, more preferably, within a range of not less than 200 μm to not greater than 1.0 mm. Alternatively, in the case of formation of a film from a highly dielectric material such as an inorganic semiconductor or a metal, it is preferable that the distance between the probe and the substrate be set within a range of not less than 200 μm to not greater than 3.0 mm, because detection is possible even in a position distant from the substrate. Setting the distance within the range allows suppression of inhibition of formation of a film directly under the probe and satisfactory measurement of the capacitance.

The smaller the probe is in diameter, the better the probe can measure a local area. However, in the case of formation of a film with use of the after-mentioned two substrates, a decrease in diameter of the probe may lead to formation of unexpected capacitance between the probe and the second substrate. Further, as far as the commercially available probe, which is used in the after-mentioned examples, is concerned, the smaller the probe becomes in diameter, the more the probe suffers from a problem such as a limit on the distance between the probe and the substrate. For this reason, it is preferable that the probe used have a diameter of approximately 10 mm.

According to the method for measuring a particle concentration according to the present embodiment, in a case where the particles used are higher in dielectric constant than the solvent of the dispersion liquid, an increase in concentration of particles in the meniscus area leads to an increase in capacitance to be measured, and a decrease in concentration of particles in the meniscus area leads to a decrease in capacitance to be measured. That is, the particle concentration and the capacitance are proportional to each other. Therefore, if a relational expression between the particle concentration and the capacitance is set up in advance by calculation or the like, the particle concentration can be measured by measuring the capacitance.

Further, even in a case where the particles used are lower in dielectric constant than the solvent of the dispersion liquid, the particle concentration and the capacitance are inversely proportional to each other. Therefore, similarly, if a relational expression between the particle concentration and the capacitance is set up in advance by calculation or the like, the particle concentration can be measured by measuring the capacitance.

It is preferable that the method according to the present embodiment include determining the particle concentration in accordance with a degree of bending of the substrate in addition to the capacitance. This makes it possible to measure and adjust the particle concentration with a higher degree of accuracy.

Such bending can be measured, for example, by placing a probe of a capacitance meter (e.g., of a capacitive displacement meter) separately so that the probe faces an surface of the first substrate opposite that surface of the first substrate on which a meniscus has appeared, measuring capacitance between the probe and the first substrate, and calculating bending of the first substrate from the capacitance.

Alternatively, it is also possible to obtain the nanoparticle concentration by (i) creating in advance a database of capacitance changes based solely on bending of the substrate in each position on the substrate by moving the substrate in the absence of a particle dispersion liquid and (ii) correcting measured capacitance values with use of the database so that capacitance changes based solely on bending of the substrate are cut to zero. This method is more preferable because it does not require provision of a separate capacitance meter.

The foregoing has described the method for measuring a particle concentration according to the present embodiment, included in a method for forming a particle film on a substrate by, while changing the position of a substrate in relation to a particle dispersion liquid with the substrate in contact with the particle dispersion liquid, evaporating the solvent in a meniscus area of the particle dispersion liquid with the meniscus area appearing on the substrate, which is a method for measuring a concentration of particles in the meniscus area. However, the method for measuring a particle concentration according to the present embodiment is not limited to such a method. The method for measuring a particle concentration according to the present embodiment may be simply used to measure a concentration of particles in a particle dispersion liquid. This brings about substantially the same effect as the present embodiment, provided that the capacitance of the particle dispersion liquid is measured and the particle concentration is determined in accordance with the capacitance.

(II) Method for Producing a Particle Film

A method for producing a particle film according to the present embodiment is a method for forming a particle film on a first substrate by, while moving the first substrate in a direction parallel to a plane of the first substrate to change from one position to another in relation to a second substrate, evaporating a solvent in a meniscus area in a particle dispersion liquid, the second substrate being placed opposite above the first substrate, the particle dispersion liquid filling a space between the first substrate and the second substrate, the meniscus area extending along the direction in which the first substrate moves to change from one position to another. The method for producing a particle film according to the present embodiment is preferably a method for forming a monoparticle film.

The method for producing a particle film includes the steps of: (a) measuring a concentration of particles in the meniscus area; and (b) adjusting the concentration of particles in the meniscus area in accordance with the particle concentration obtained in step (a).

(II-I) Step (a) (Particle Concentration Measuring Step)

Step (a) is a step of measuring a concentration of particles in the meniscus area. For example, step (a) can be executed by the method for calculating a particle concentration from capacitance, which have been described above in the "(I) Method for Measuring a Particle Concentration" section, the method for obtaining a particle concentration by utilizing light scattering, or the like.

For example, in a case where step (a) is executed by the method for calculating a particle concentration from capacitance, it can be executed by grounding the first substrate and placing a probe of a capacitance meter so that the probe faces that surface of the first substrate on which a meniscus has appeared, as in the "(I) Method for Measuring a Particle Concentration" section above.

It is preferably that step (a) include measuring capacitance in an area in the meniscus that includes the particle dispersion liquid and determining a particle concentration from the capacitance. In this case, as in the "(I) Method for Measuring a Particle Concentration" section above, an object whose capacitance is to be measured is not particularly limited, provided that it is an area in the meniscus that includes the particle dispersion liquid. It is possible to measure only capacitance in the meniscus area (which is, in reality, capacitance in an area composed of the particle dispersion liquid and an air layer between the dispersion liquid and the probe). Alternatively, it is possible to measure capacitance in a combination of the meniscus area and an area composed of the particle dispersion liquid, the second substrate, and an air layer between the second substrate and the probe.

It is preferable that the distance between the probe and the first substrate be similarly set within a range of not less than 200 μm to not greater than 3,000 μm or, more preferably, within a range of not less than 200 μm to not greater than 1.0 mm.

(II-II) Step (b) (Particle Concentration Adjusting Step)

Step (b) is a step of adjusting the concentration of particles in the meniscus area in accordance with the particle concentration obtained in step (a).

In step (b), specifically, if the particle concentration obtained in step (a) is lower than a set particle concentration, the concentration in the meniscus area is adjusted to be higher, and if the particle concentration obtained in step (a) is higher than the set particle concentration, the concentration in the meniscus area is adjusted to be lower.

The particle concentration on which step (b) is based, which may be the particle concentration based on which a desired coverage is obtained, can be obtained, for example, by obtaining the coverage of a particle film formed in a predetermined particle concentration with the first substrate moving at a predetermined speed and by calculating k from the following relational expression:

$$c=k\times\psi/(v(1-\psi)),$$

where c is the coverage, k is a constant, ψ is the concentration of particles in the dispersion liquid (% by volume), and v is the speed at which the first substrate moves (μm/s).

Examples of the method for adjusting a particle concentration include (i) a method for applying an electric field between the first substrate and the second substrate, (ii) a method for adding a high-concentration particle dispersion liquid or a low-concentration particle dispersion liquid to the particle dispersion liquid, (iii) a method for changing the speed (displacement speed) at which the first substrate moves, etc.

According to the method (i), for example, in a case where the particle concentration obtained in step (a) is lower than the set particle concentration, the particles in the particle dispersion liquid can be electrophoresed toward the meniscus by applying an electric field in a direction toward the meniscus.

Alternatively, in a case where the particle concentration obtained in step (a) is higher than the set particle concentration, the particles in the particle dispersion liquid can be electrophoresed away from the meniscus by applying an electric field in a direction away from the meniscus.

The particle concentration may be controlled by either of these operations or by both of the operations.

According to the method (ii), for example, in a case where the particle concentration obtained in step (a) is lower than the set particle concentration, the concentration of the particle dispersion liquid can be increased by adding, to the particle dispersion liquid, a prepared particle dispersion liquid whose concentration is higher than the initial concentration of the particle dispersion liquid and, as a result, the concentration of particles in the meniscus area can be increased.

Alternatively, in a case where the particle concentration obtained in step (a) is higher than the set particle concentration, the concentration of the particle dispersion liquid can be reduced by adding, to the particle dispersion liquid, a prepared particle dispersion liquid whose concentration is lower than the initial concentration of the particle dispersion liquid and, as a result, the concentration of particles in the meniscus area can be reduced.

As for the method (ii), too, the particle concentration may be controlled by either of these operations or by both of the operations.

According to the method (iii), for example, in a case where the particle concentration obtained in step (a) is lower than the set particle concentration, the amount of particles that are discharged from the meniscus for film formation is reduced by slowing down the speed at which the first substrate moves and, as a result, the concentration of particles in the meniscus area can be made higher than the initial concentration.

Alternatively, in a case where the particle concentration obtained in step (a) is higher than the set particle concentration, the amount of particles that are discharged from the meniscus for film formation is increased by increasing the speed at which the first substrate moves and, as a result, the concentration of particles in the meniscus area can be made lower than the initial concentration.

As for the method (iii), too, the particle concentration may be controlled by either of these operations or by both of the operations.

The foregoing description presupposes a configuration of the method (iii) in which only the first substrate is moved. However, the amount of particles that are discharged from the meniscus for film formation can be similarly adjusted, for example, by a configuration in which only the second substrate is moved or a configuration in which both the first and second substrates are moved. Therefore, these configurations bring about substantially the same effect as the foregoing configuration.

The amount of an electric field to be applied in the method (i), the amount of a dispersion liquid to be added in the method (ii), and the speed at which the first substrate moves in the method (iii) can be calculated as needed from the difference between the set particle concentration and the particle concentration measured in step (a).

(II-III) Step (c) (Bending-Measuring Step)

In a case where step (a) is executed by calculating a particle concentration from capacitance, it is preferable that the method for producing a particle film according to the present embodiment further include the step of (c) measuring a degree of bending of the first substrate.

In this case, step (a) includes determining the particle concentration in accordance with a degree of bending of the substrate in addition to the capacitance. This makes it possible to measure and adjust the particle concentration with a higher degree of accuracy.

Step (c) is not necessary in the absence of bending of the first substrate used. Normally, however, there occurs bending in such a thin plate-shaped object. Moreover, due to such bending, there occurs a change in range of measurement of capacitance (in amount of the air layer) in step (a), and such a change may lead to an error in the particle concentration to be measured. Therefore, by determining the particle concentration in accordance with a degree of bending of the substrate as measured in step (c), the particle concentration can be measured and adjusted with a higher degree of accuracy.

Step (c) can be executed, for example, by placing a probe of a separate capacitance meter so that the probe faces an surface of the first substrate opposite that surface of the first substrate on which a meniscus has appeared, measuring capacitance between the probe and the first substrate, and calculating bending of the first substrate from the capacitance.

Step (c) may be executed during production of a particle film or may be executed by measuring bending of the first substrate in advance before feeding the particle dispersion liquid. That is, it is also possible to obtain the nanoparticle concentration by (i) creating in advance a database of capacitance changes based solely on bending of the first substrate, on which the particle film is formed, in each position on the first substrate by moving the first substrate in the absence of a particle dispersion liquid prior to film formation and (ii) correcting capacitance values, measured during film formation, on a computer with use of the database so that capacitance changes based solely on bending of the substrate are cut to zero. This method is more preferable because it does not require separate placement of a probe of a capacitance meter.

Alternatively, instead of determining the particle concentration in accordance with a degree of bending, it is also possible to correct the position of the probe or the like of the capacitance meter in accordance with the degree of bending. However, from the point of view of suppressing generation of noise due to movement of the probe, the method for determining the particle concentration in accordance with a degree of bending is more preferable. Step (c) may be executed during production of a particle film or may be executed by measuring bending of the first substrate in advance before feeding the particle dispersion liquid. In the case of measurement of bending of the first substrate in advance, for example, the particle concentration can be measured and adjusted with a higher degree of accuracy by first creating, through the measurement, a database of bending of the first substrate in relation to positions on the first substrate and then, in step (a), correcting the position of the probe or the like of the capacitance meter in accordance with the database.

(II-IV) Substrate

The first substrate for use in the present embodiment is not particularly limited, provided that it is a substrate on a surface of which a film of particles can be formed, but examples of the first substrate include a silicon substrate, a glass substrate, a metal substrate, a metal oxide substrate, a metal nitride substrate, a polymer substrate, an organic crystal substrate, a substrate made of a flat and smooth mineral such as mica, etc.

Further, from the point of view of making it easy to form a film of particles on the first substrate, the first substrate may be a substrate whose surface is coated with a binder layer. The binder layer may vary appropriately depending on the type of particles from which a film is formed, etc., but in a case where the particles used are Au particles, examples of the binder layer include: a thin-film layer of a polymer, such as modified polyethylene imine, polyvinyl pyrrolidone, or polyvinyl pyridine, which has an amino group; an amine self-assembled monolayer; and a layer of a hydrocarbon polymer, such as polystyrene, activated by atmospheric plasma containing minutely small amounts of oxygen, nitrogen, and water vapor and being composed mainly of a noble gas such as He or Ar.

Further, in a case where the particle concentration is adjusted in step (b) by applying an electric field between the first substrate and the second substrate, the first substrate and the second substrate need to have conductive surfaces. In this case, examples of the first substrate include an ITO (indium tin oxide) substrate, an FTO (fluoride-tin-oxide) substrate, a $ZnO_2$ (zinc oxides) substrate, a silicon substrate, a metal substrate, and a conductive polymer substrate.

Examples of the second substrate include, but are not limited to, a silicon substrate, a glass substrate, a metal substrate, a metal oxide substrate, a metal nitride substrate, a polymer substrate, an organic crystal substrate, a substrate made of a flat and smooth mineral such mica, etc. In a case where the particle concentration is adjusted in step (b) by applying an electric field between the first substrate and the second substrate, the second substrate also needs to have a conductive surface. In this case, examples of the second substrate include an ITO (indium tin oxide) substrate, an FTO (fluoride-tin-oxide) substrate, a $ZnO_2$ (zinc oxides) substrate, a silicon substrate, a metal substrate, and a conductive polymer substrate.

The distance between the first substrate and the second substrate in the meniscus area may vary appropriately depending on the diameter of each of the particles from which a film is made, etc. and is not particularly limited, provided that it is 200 μm or shorter. For example, when each particle has a diameter of 1 μm, the distance can be set within a range of 10 μm to 200 μm.

The second substrate may be parallel or at an angle to the first substrate. However, it is preferable the second substrate be placed at an angle to the first substrate so that the distance between the first substrate and the second substrate on a side toward which the first substrate moves to change from one position to another is shorter than the distance between the first substrate and the second substrate on a side opposite to the side.

In a case where the second substrate is placed at an angle to the first substrate, the angle of the second substrate to the plane of the first substrate can be set, for example, within a range of 0.1 to 0.5°.

(II-V) Particle Dispersion Liquid

The particle dispersion liquid is a dispersion liquid obtained by dispersing, in a solvent, particles from which a film is formed. The particles are not particularly limited, provided that a film can be formed from them on the first substrate, but examples of the particles include fine particles of such a polymer as typified by polystyrene or polyacrylic acid, fine particles of such a metal oxide as typified by silica or titanium oxide, fine particles of such a compound semiconductor as typified cadmium tellurium or cadmium selenium, fine particles of such a metal such as typified by gold, silver, or copper, fine particles of a biocompatible material such as titanium or hydroxyapatite, fine particle of carbon such as fullerene, etc.

In a case where the particle concentration is adjusted in step (b) by applying an electric field between the first substrate and the second substrate, it is preferable that the particles be particles that become charged in the dispersion liquid.

The smaller the particles are in diameter, the more densely the resulting monolayer film is filled, which is preferable. The method according to the present embodiment can, for example, use particles each having a diameter in a range of 3 to 2,000 nm.

The solvent is not particularly limited, provided that it is a conductive solvent that allows the nanoparticles to be charged in the solution. Examples of the solvent include ultrapure water, an aqueous solution obtained by dissolving ion species of sodium, calcium, etc. in ultrapure water, an ionic liquid, an aqueous polymer solution, etc.

The concentration of particles in the particle dispersion liquid can vary appropriately depending on the speed at which the substrate move and the coverage of the particle film to be produced.

Figure 9:
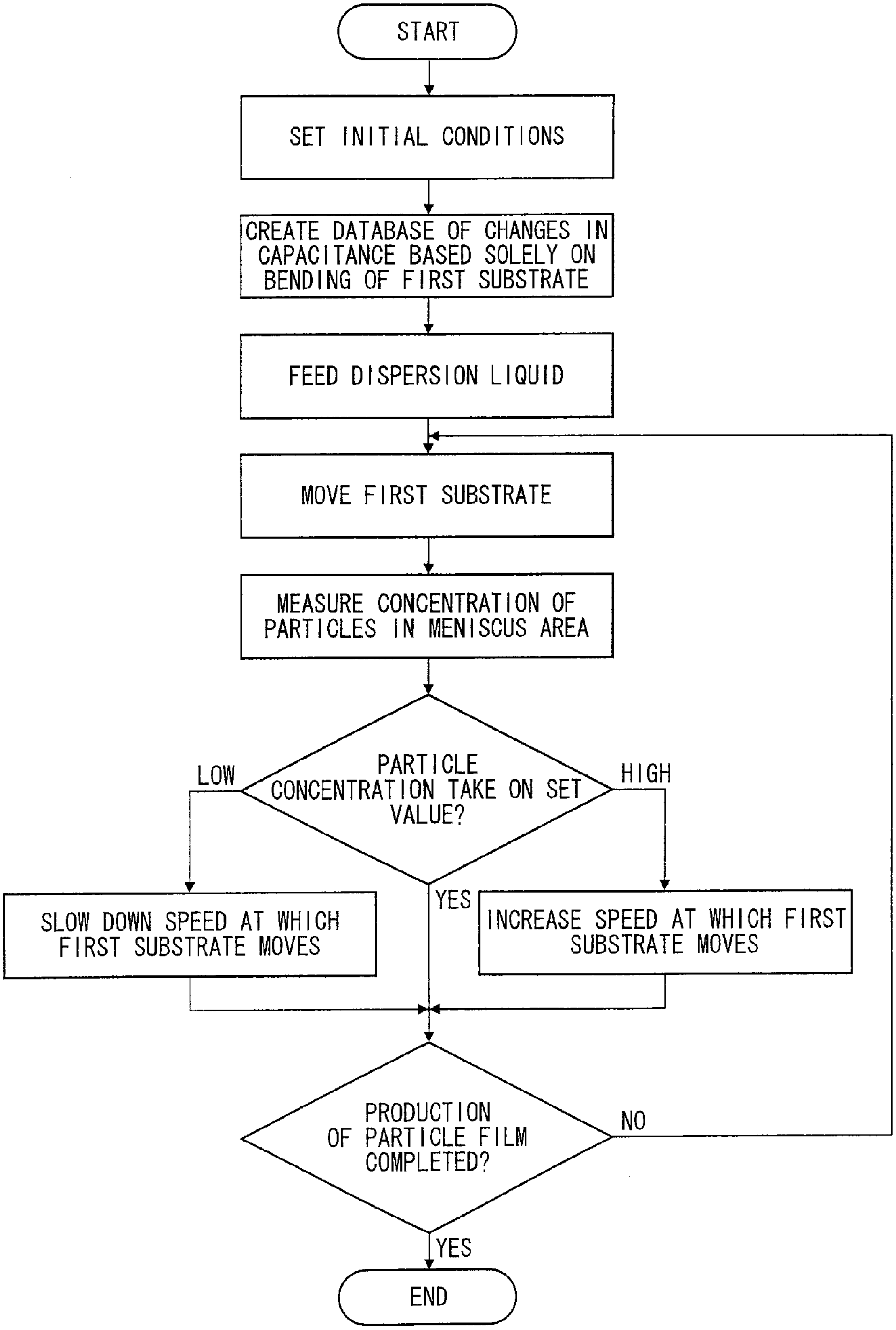
FIG. 9 is a flow chart showing an example of a method for producing a particle film according to the present embodiment.
Figure 10:
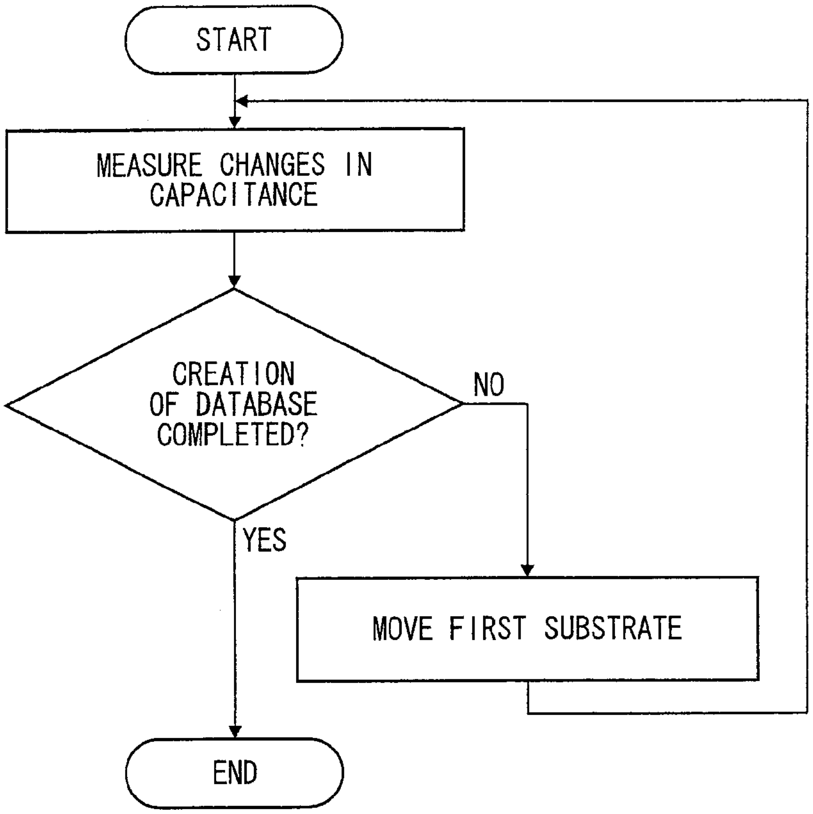
FIG. 10 is a flow chart showing an example of a method, included in the method of FIG. 9, for creating a database of capacitance changes based solely on bending of the first substrate.

FIG. 9 shows a flow chart of an example of the aforementioned method for producing a particle film. It should be noted that in this example of the production method includes measuring capacitance in an area in the meniscus that includes the particle dispersion liquid and determining a particle concentration from the capacitance.

According to the production method, as shown in FIG. 9, initial conditions such as the film-forming speed and the position on the substrate in which the film is formed are set first, and a database of capacitance changes based solely on bending of the first substrate in each position on the first substrate is created then (step (c)).

Next, the particle film is formed on the first substrate by filling a space between the first substrate and the second substrate with the particle dispersion liquid, forming a meniscus, and moving the first substrate while evaporating the solvent.

It should be noted here that during the formation of the particle film, the concentration of particles in the meniscus area is measured every predetermined period of time (step (a)). The particle concentration is measured by obtaining a nanoparticle concentration by correcting measured capacitance values on a computer, with use of the database of capacitance changes based solely on bending of the first substrate 1, so that capacitance changes based solely on bending of the first substrate 1 are cut to zero.

Then, the particle concentration is adjusted in accordance with the concentration thus obtained (step (b)). Specifically, if the particle concentration thus measured is higher than the set value, the speed at which the first substrate moves is increased, or if the particle concentration thus measured is lower than the set value, the speed at which the first substrate moves is slowed down. Moreover, by repeating this series of operations until completion of film formation, the particle film can be produced.

It should be noted that the aforementioned database of capacitance changes based solely on bending of the first substrate is created, specifically, by first measuring capacitance changes based solely on bending of the first substrate in the absence of a particle dispersion liquid, outputting results of the measurement to a computer or the like together with position information of the first substrate, and then repeating these operations until the end of creation of the database while moving the first substrate.

Alternatively, another example of a method for suppressing an error due to bending of the first substrate is a method for correcting the position of the probe in the capacitance meter by piezoelectric control. However, from the point of view of suppressing generation of noise due to movement of the probe, the aforementioned method for obtaining a nanoparticle concentration by correcting, on a computer, particle concentration values measured based on degrees of bending is more preferable.

Figure 11:
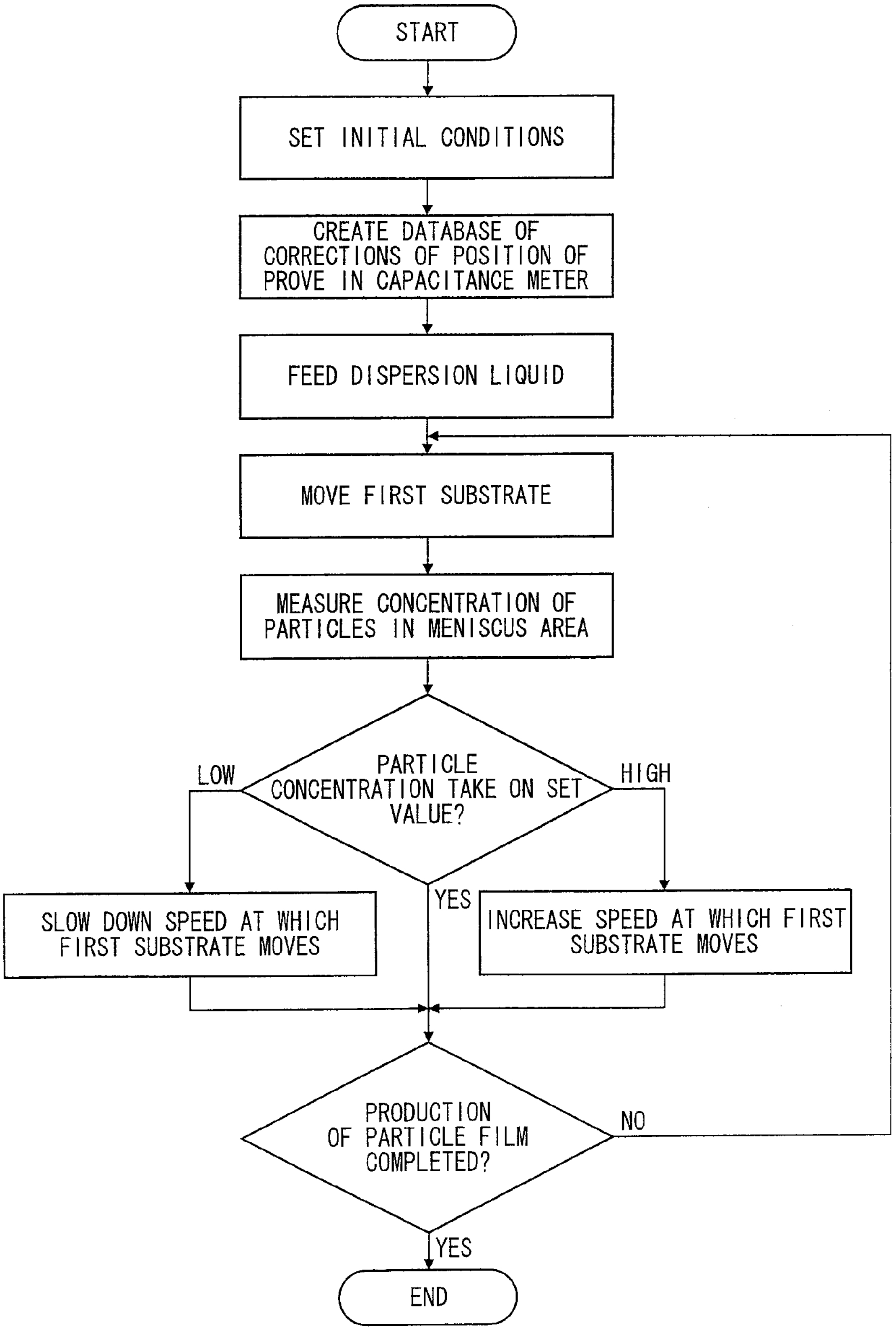
FIG. 11 is a flow chart showing another example of a method for producing a particle film according to the present embodiment.

The method for correcting the position of the probe in the capacitance meter by piezoelectric control is carried out in the following manner. Specifically, as shown in FIG. 11, initial conditions such as the film-forming speed and the position on the substrate in which the film is formed are set first, and a database for correcting the position of the probe in the capacitance meter in accordance with slight differences, such as bending, in surface shape of the first substrate is created then.

Next, the particle film is formed on the first substrate by filling a space between the first substrate and the second substrate with the particle dispersion liquid, forming a meniscus, and moving the first substrate while evaporating the solvent.

It should be noted here that during the formation of the particle film, the concentration of particles in the meniscus area is measured every predetermined period of time by correcting the position of the probe in the capacitance meter in accordance with the database created in advance (step (a)). Then, as in the case of the aforementioned method, the particle concentration is adjusted in accordance with results of the measurement (step (b)).

Figure 12:
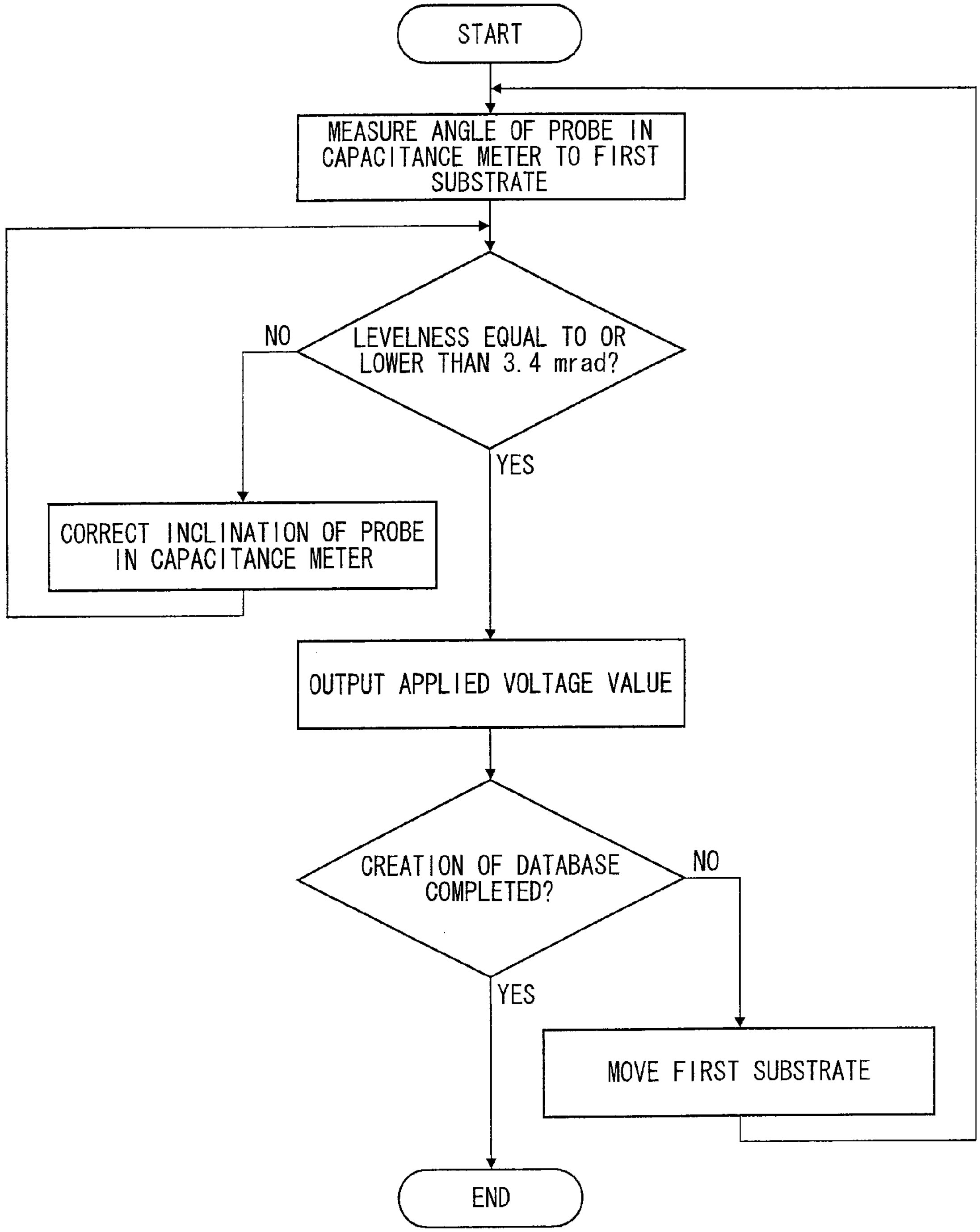
FIG. 12 is a flow chart showing an example of a method, included in the method of FIG. 11, for creating a database of capacitance probe positions.

It should be noted that the database for correcting the position of the probe in the capacitance meter is created in the following manner. Specifically, as shown in FIG. 12, capacitance is measured by a probe of a capacitance meter in the absence of a particle dispersion liquid, with the probe placed to face a surface of the first substrate, and the position of the probe in the capacitance meter in relation to the first substrate (specifically, the inclination of a measuring plane of the probe in the capacitance meter in relation to the plane of the first substrate) is calculated from the capacitance (step (c)).

If the inclination of the measuring plane of the probe in the capacitance meter in relation to the plane of the first substrate exceeds 3.4 mrad, the position of the probe in the capacitance meter is corrected so that the inclination becomes not greater than 3.4 mrad, and this operation is repeated until the inclination of the measuring plane of the probe in the capacitance meter in relation to the plane of the first substrate becomes not greater than 3.4 mrad. When the inclination has become not greater than 3.4 mrad, changes in voltage value as changes in capacitance value are outputted to a computer or the like together with position information of the first substrate. Then, by carrying out these operations for each position on the first substrate in which the particle film is formed, a database of degrees of correction of the position of the probe in the capacitance meter in each position on the first substrate is created.

Creation of such a database eliminates the need to execute step (c) during film formation and makes it possible to prevent an error of measurement of particle concentration from occurring due to a slight difference in shape of the substrate.

The flow charts of FIGS. 9 and 11 have shown, as examples of the method for adjusting a particle concentration, the method for changing the speed at which the first substrate moves. However, as a matter of course, it is also possible to adopt the aforementioned method for applying an electric field between the first substrate and the second substrate or the aforementioned method for adding a high-concentration particle dispersion liquid or a low-concentration particle dispersion liquid to the particle dispersion liquid.

Further, although a threshold for the inclination of the measuring plane of the probe in the capacitance meter in relation to the plane of the first substrate has been set at 3.4 mrad, this value can vary appropriately for any purpose.

(III) Apparatus for Producing a Particle Film

The aforementioned method for producing a particle film according to the present embodiment can be more suitably implemented, for example, by a production apparatus described below.

FIG. 1 shows a cross-sectional view schematically showing an example of an apparatus for producing a particle film according to the present embodiment. Further, FIG. 2 shows a perspective view schematically showing an example of arrangement of a first substrate 1 and a second substrate 2 in the apparatus for producing a particle film according to the present embodiment.

Figure 2:
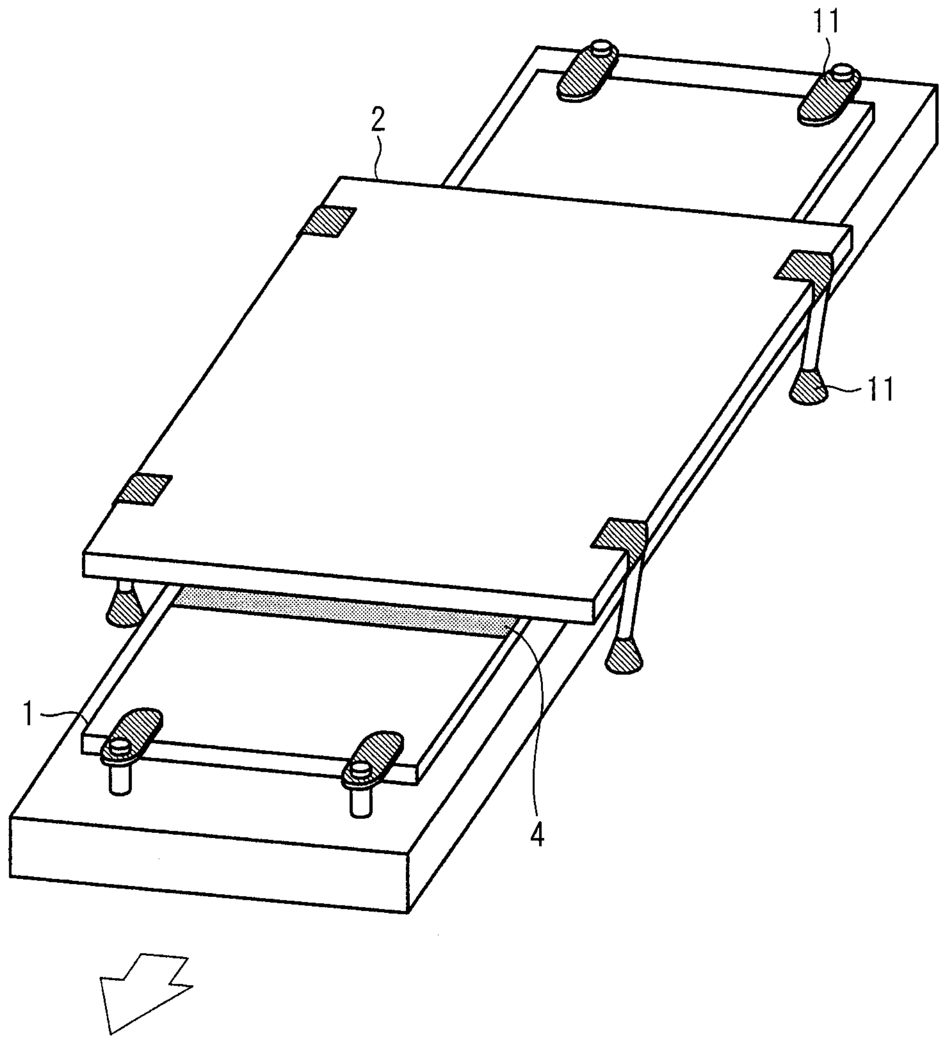
FIG. 2 is a perspective view schematically showing an example of arrangement of a first substrate and a second substrate in the apparatus for producing a particle film according to the present embodiment.

As shown in FIGS. 1 and 2, the apparatus 20 for producing a particle film according to the present embodiment is an apparatus for forming a particle film on a first substrate 1 by, while moving the first substrate 1 in a direction parallel to a plane of the first substrate 1 to change from one position to another in relation to a second substrate 2, evaporating a solvent in a meniscus area 5 in a particle dispersion liquid 4, the second substrate 2 being placed opposite above the first substrate 1, the particle dispersion liquid 4 filling a space between the first substrate 1 and the second substrate 2, the meniscus area 5 extending along the direction in which the first substrate 1 moves to change from one position to another.

The apparatus 20 for producing a particle film includes: substrate placing means 11 for placing the first substrate 1 and the second substrate 2 so that they face each other; substrate moving means 12 for changing the position of the first substrate 1 in relation to the position of the second substrate 2 along the direction parallel to the plane of the first substrate 1; particle concentration measuring means 3 for measuring a concentration of particles in the meniscus area 5; and particle concentration adjusting means 13 for adjusting the concentration of particles in the meniscus area 5 in accordance with the particle concentration measured by the particle concentration measuring means 3.

(III-I) Substrate Placing Means

The substrate placing means 11 is not particularly limited, provided that it is configured to place the first substrate 1 and the second substrate 2 so that they face each other. For example, as shown in FIG. 2, the substrate placing means 11 may be configured such that the second substrate 2 is fixed by a fixing device such as a clamp and the first substrate 1 is fixed to a board or the like, provided with a fixing device such as a clamp, which has a surface on which the first substrate 1 is mounted. In the case of such a configuration, by moving the board or the like, on which the first substrate 1 has been mounted, by the substrate moving means 12, the first substrate 1 is allowed to change from one position to another along the direction parallel to the plane of the first substrate 1.

(III-II) Substrate Moving Means

The substrate moving means 12 is not particularly limited, provided that it can change the position of the first substrate 1 in relation to the position of the second substrate 2. For example, the substrate moving means 12 is configured to move the first substrate 1 by a stepping motor, a servo-motor-controlled X stage, or the like. Alternatively, the substrate moving means 12 may be configured to move the second substrate 2 by a stepping motor or the like with the first substrate 1 fixed.

(III-III) Particle Concentration Measuring Means

The particle concentration measuring means 3 is not particularly limited, provided that it can measure a concentration of particles in the meniscus area 5. For example, the particle concentration measuring means 3 is configured as a capacitance meter, which has been described above in the "(I) Method for Measuring a Particle Concentration" section, or a configuration for obtaining a particle concentration by utilizing light scattering or light reflection.

For example, in the case of measurement of capacitance, the particle concentration measuring means can be configured to include: a capacitance meter; and particle concentration calculating means for calculating a particle concentration in accordance with capacitance measured by the capacitance meter.

(III-IV) Particle Concentration Adjusting Means

The particle concentration adjusting means 13 is configured, for example, to adjust the concentration of particles in the meniscus area 5 by applying an electric field between the first substrate 1 and the second substrate 2.

It should be noted here that as shown in FIG. 1, a straight line connecting (a) an end 10 of the second substrate 2 that is in contact with the particle dispersion liquid 4 in the meniscus area 5 with (b) a portion of the first substrate 1 that is in contact with an end of the meniscus area 5 of the particle dispersion liquid 4 is not perpendicular to the direction parallel to the plane of the first substrate 1, but inclines from the second substrate 2 to the first substrate 1 as it extends closer to the meniscus area 5. For this reason, a line of electric force that is generated from the second substrate 2 to the first substrate 1 extends in a direction toward the meniscus area 5. Therefore, by applying an electric field from the first substrate 1 to the second substrate 2, particles can be moved toward the meniscus area 5.

Although, in FIG. 1, the particle concentration adjusting means 13 is configured to adjust the concentration of particles in the meniscus area 5 by applying an electric field between the first substrate 1 and the second substrate 2, this does not imply any limitation. The particle concentration adjusting means 13 may be configured, for example, to add a high-concentration particle dispersion liquid or a low-concentration particle dispersion liquid to the particle dispersion liquid. This brings about substantially the same effect as the present embodiment, provided that the particle concentration adjusting means 13 can adjust the concentration of particles in the meniscus area 5. An example of such a configuration is a configuration for adding a high-concentration particle dispersion liquid or a low-concentration particle dispersion liquid by a syringe pump, a tube head, or the like.

Alternatively, the particle concentration adjusting means 13 may be configured to adjust the concentration of particles in the meniscus area 5 by changing the speed at which at least either the first substrate 1 or the second substrate moves, i.e., by controlling the sweep rate.

However, in a case where the particle concentration adjusting means 13 is configured, as in the present embodiment, to adjust the concentration of particles in the meniscus area 5 by applying an electric field between the first substrate 1 and the second substrate 2, the particle concentration can be controlled more easily, which brings about an especially significant effect.

(III-V) Bending-Measuring Means

In a case where the particle concentration measuring means calculate a particle concentration from capacitance, it is preferable that the apparatus for producing a particle film according to the present embodiment further include bending-measuring means for measuring a degree of bending of the first substrate.

Figure 13:
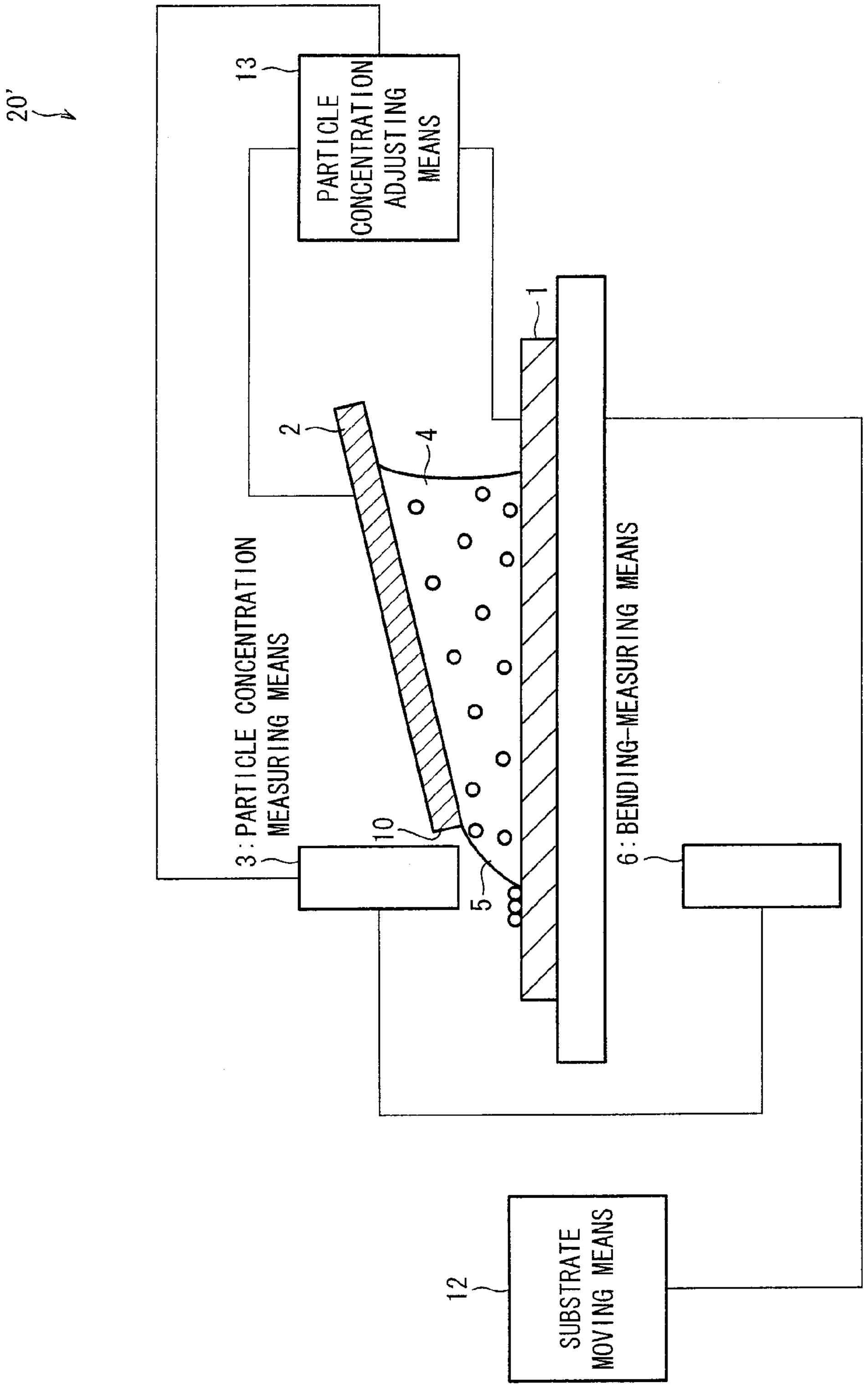
FIG. 13 is a cross-sectional view schematically showing another example of an apparatus for producing a particle film according to the present embodiment.

FIG. 13 shows a cross-sectional view schematically showing an example of an apparatus for producing a particle film including bending-measuring means.

Since the production apparatus 20' of FIG. 13 includes the bending-measuring means 6, the production apparatus 20' can measure and adjust a particle concentration with a higher degree of accuracy.

Specifically, for example, by placing a probe of a capacitance meter separately so that the probe faces an surface of the first substrate 1 opposite that surface of the first substrate 1 on which the meniscus area 5 has appeared and measuring capacitance between the probe and the first substrate 1, the bending-measuring means 6 can calculate bending of the first substrate 1 from the capacitance. This allows the particle concentration measuring means 3, as a result, to determine the particle concentration in accordance with a degree of bending measured by the bending-measuring means 6, in addition to the capacitance.

This makes it possible to prevent an error from occurring due to a slight difference in shape of the substrate, thus making it possible to measure and adjust a particle concentration with a higher degree of accuracy.

It should be noted here that the measurement of a degree of bending of the first substrate 1 by the bending-measuring means 6 may be performed during production of a particle film or may be performed by measuring bending of the first substrate 1 in advance before feeding the particle dispersion liquid.

In the case of measurement of bending of the first substrate in advance, the particle concentration can be measured and adjusted with a higher degree of accuracy by creating, through the measurement, a database of bending of the first substrate in relation to positions on the first substrate, correcting an error due to bending of the first substrate in accordance with the database, and calculating the particle concentration.

More specifically, it is also possible to obtain the nanoparticle concentration by (i) creating in advance a database of capacitance changes based solely on bending of the first substrate, on which the particle film is formed, in each position on the first substrate by moving the first substrate in the absence of a particle dispersion liquid prior to film formation and (ii) correcting capacitance values, measured during film formation, on a computer with use of the database so that capacitance changes based solely on bending of the substrate are cut to zero.

Thus, in the case of measurement of bending of the first substrate in advance, such bending can be measured with use of the particle concentration measuring means 3. This eliminates the need to provide the bending-measuring means 6 separately, thus rendering the apparatus simpler in structure.

Figure 14:
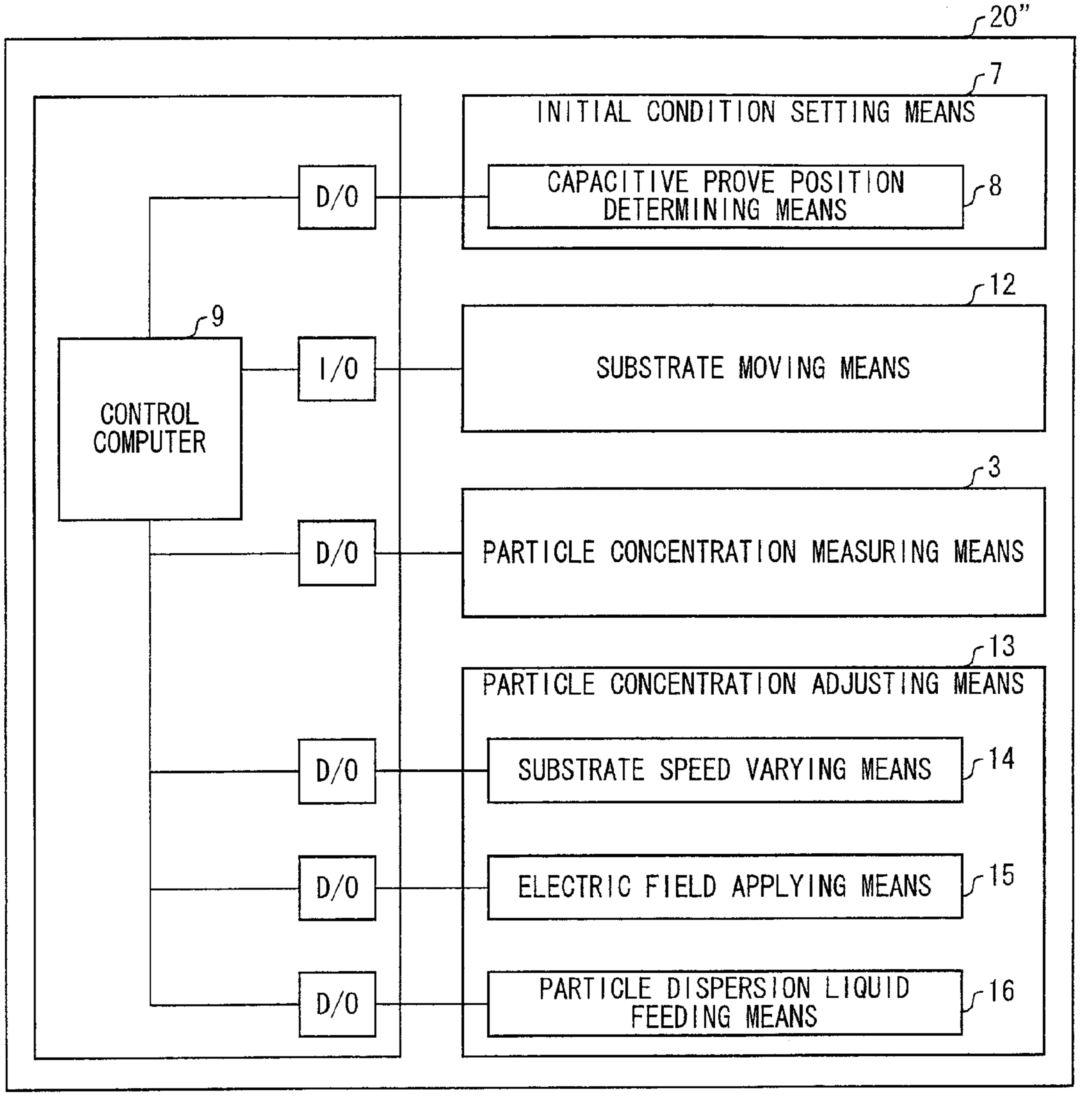
FIG. 14 is a block diagram schematically showing still another example of an apparatus for producing a particle film according to the present embodiment.

Instead of determining the particle concentration in accordance with a degree of bending, it is also possible to suppress an error due to bending or the like of the first substrate 1 by correcting the position of the particle concentration measuring means 3 such as a probe of a capacitance meter in accordance with a degree of bending. FIG. 14 is a block diagram schematically showing an example of an apparatus for producing a particle film according to such an embodiment. However, from the point of view of suppressing generation of noise due to movement of the probe, the method for correcting the particle concentration in accordance with a degree of bending is more preferable.

As shown in FIG. 14, a production apparatus 20" is configured such that initial condition setting means 7, substrate moving means 12, and particle concentration adjusting means 13 are controlled by a control computer 9. Moreover, the apparatus 20" for producing a particle film includes, as the particle concentration adjusting means 13, substrate speed varying means 14, electric field applying means 15, and particle dispersion liquid feeding means 16, each of which is connected to the control computer 9.

The production apparatus 20" includes the initial condition setting means 7 for setting initial conditions before the start of production of a particle film. The initial condition setting means 7 is means for setting initial conditions for film formation by inputting the film-forming speed, the position on the substrate in which the film is formed, etc.

Further, the initial condition setting means 7 includes capacitance probe position determining means 8 and uses the capacitance probe position determining means 8 to create a database for correcting the position of the probe of the capacitance meter in accordance with slight differences, such as bending, in shape of the substrate.

Specifically, by moving the first substrate, on which the particle film is formed, in the absence of a particle dispersion liquid, a database for correcting the position of the probe of the capacitance meter in accordance with an error in shape of the first substrate 1 in each position on the first substrate is created. Creation of such a database allows the particle concentration measuring means 3 to correct the position of the probe of the capacitance meter in accordance with the database. This makes it possible to prevent an error of measurement of particle concentration from occurring due to a slight difference in shape of the first substrate 1.

It should be noted the present invention, described above, can be rephrased for example as follows:

That is, a method for producing a particle film according to the present embodiment is a method for forming a particle film on a first substrate by, while moving the first substrate in a direction parallel to a plane of the first substrate to change from one position to another in relation to a second substrate, evaporating a solvent in a meniscus area in a particle dispersion liquid, the second substrate being placed opposite above the first substrate, the particle dispersion liquid filling a space between the first substrate and the second substrate, the meniscus area extending along the direction in which the first substrate moves to change from one position to another, the method including the steps of: (a) measuring a concentration of particles in the meniscus area; and (b) adjusting the concentration of particles in the meniscus area in accordance with the particle concentration measured in step (a).

According to the foregoing method, since step (b) adjusts the concentration of particles in the meniscus area in accordance with the particle concentration measured by in step (a), it is possible to form a film while adjusting the concentration of particles in the meniscus area so that the concentration of particles in the meniscus area takes on a constant value. This brings about an effect of making it possible to form a particle film uniformly even on a substrate of a practical size.

Furthermore, because, even with an increase in the speed at which the first substrate changes from one position to another, the concentration of particles in the meniscus area can be adjusted so that the concentration of particles in the meniscus area takes on a constant value, the particle film can be formed uniformly in a shorter period of time. This makes it possible to produce a particle film with higher production efficiency.

The method for producing a particle film according to the present invention is preferably configured such that step (a) includes (i) measuring capacitance in an area including the meniscus area and (ii) determining a particle concentration from the capacitance.

According to the foregoing method, since the capacitance can be easily measured with high sensitivity without bringing a probe into contact with the particle dispersion liquid, the particle concentration can be measured easily with a higher degree of accuracy in step (a). This brings about a further effect of making it possible to form a particle film easily and more uniformly.

The method for producing a particle film according to the present invention is preferably configured to further include the step of (c) measuring a degree of bending of the first substrate, wherein step (a) includes determining the particle concentration in accordance with the degree of bending measured in step (c), in addition to the capacitance.

According to the foregoing method, since the particle concentration is determined in accordance with the degree of bending in addition to the capacitance, the particle concentration can be measured with a higher degree of accuracy in step (a). Therefore, the particle concentration can be adjusted with a higher degree of accuracy in step (b). This brings about a further effect of making it possible to form a particle film more uniformly.

The method for producing a particle film according to the present invention is preferably configured such that step (b) includes adjusting the concentration of particles in the meniscus area by applying an electric field between the first substrate and the second substrate.

According to the foregoing method, the particle concentration can be adjusted more easily in step (b). This brings about a further effect of making it possible to form a particle film more easily.

The method for producing a particle film according to the present invention is preferably configured such that the second substrate is placed at an angle to the first substrate so that the distance between the first substrate and the second substrate on a side toward which the first substrate moves to change from one position to another is shorter than the distance between the first substrate and the second substrate on a side opposite to the side.

According to the foregoing method, since the second substrate is placed at an angle to the first substrate, a line of contact between the particle dispersion liquid in the meniscus area and the first substrate can be made more uniform. This brings about a further effect of making it possible to form a particle film more uniformly.

In order to attain the foregoing object, an apparatus for producing a particle film according to the present invention is an apparatus for forming a particle film on a first substrate by, while moving the first substrate in a direction parallel to a plane of the first substrate to change from one position to another in relation to a second substrate, evaporating a solvent in a meniscus area in a particle dispersion liquid, the second substrate being placed opposite above the first substrate, the particle dispersion liquid filling a space between the first substrate and the second substrate, the meniscus area extending along the direction in which the first substrate moves to change from one position to another, the apparatus including: particle concentration measuring means for measuring a concentration of particles in the meniscus area; and particle concentration adjusting means for adjusting the concentration of particles in the meniscus area in accordance with the particle concentration measured be the particle concentration measuring means.

According to the foregoing configuration, since the particle concentration adjusting means adjusts the concentration of particles in the meniscus area in accordance with the particle concentration measured by the particle concentration measuring means, it is possible to form a film while adjusting the concentration of particles in the meniscus area so that the concentration of particles in the meniscus area takes on a constant value. This brings about an effect of making it possible to form a particle film uniformly even on a substrate of a practical size.

The apparatus for producing a particle film according to the present invention is preferably configured such that the particle concentration measuring means measures capacitance in an area including the meniscus area with use of a capacitance meter and determines a particle concentration from the capacitance.

According to the foregoing configuration, since the capacitance can be easily measured with high sensitivity without bringing a probe into contact with the particle dispersion liquid, the particle concentration measuring means can measure the particle concentration easily with a higher degree of accuracy. This brings about a further effect of making it possible to form a particle film more easily and uniformly.

The apparatus for producing a particle film according to the present invention is preferably configured to further include bending-measuring means for measuring a degree of bending of the first substrate, wherein the particle concentration measuring means determines the particle concentration in accordance with the degree of bending measured by the bending-measuring means, in addition to the capacitance.

According to the foregoing method, since the bending-measuring means determines the particle concentration in accordance with the degree of bending in addition to the capacitance, the particle concentration measuring means can measure the particle concentration with a higher degree of accuracy. Therefore, the particle concentration adjusting means can adjust the particle concentration with a higher degree of accuracy. This brings about a further effect of making it possible to form a particle film more uniformly.

The apparatus for producing a particle film according to the present invention is preferably configured such that the particle concentration adjusting means adjusts the concentration of particles in the meniscus area by applying an electric field between the first substrate and the second substrate.

According to the foregoing configuration, the particle concentration adjusting means can adjust the particle concentration more easily. This brings about a further effect of making it possible to form a particle film more easily.

The apparatus for producing a particle film according to the present invention is preferably configured such that the second substrate is placed at an angle to the first substrate so that the distance between the first substrate and the second substrate on a side toward which the first substrate moves to change from one position to another is shorter than the distance between the first substrate and the second substrate on a side opposite to the side.

According to the foregoing configuration, since the second substrate is placed at an angle to the first substrate, a line of contact between the particle dispersion liquid in the meniscus area and the first substrate can be made more uniform. This brings about a further effect of making it possible to form a particle film more uniformly.

The apparatus for producing a particle film according to the present invention is preferably configured such that the particle concentration adjusting means adjusts the concentration of particles in the meniscus area by changing a speed at which the first substrate changes from one position to another.

According to the foregoing configuration, the particle concentration adjusting means can control the particle concentration more easily. This brings about a further effect of making it possible to form a particle film more easily.

In order to attain the foregoing object, a method for measuring a particle concentration according to the present invention includes the steps of: measuring capacitance in a particle dispersion liquid; and determining a particle concentration in accordance with the capacitance.

According to the foregoing method, since, for example, the concentration of particles in the meniscus area can be obtained while forming the particle film, it becomes possible to adjust, in accordance with the particle concentration obtained as a result, the concentration of particles in the meniscus so that the concentration of particles in the meniscus takes on a constant value. This brings about an effect of making it possible to form a particle film uniformly even on a substrate of a practical size.

EXAMPLES

In the following, the present invention is described in more detail with reference to examples. However, the present invention is not to be limited to these examples.

Reference Example 1

Dispersion liquids were prepared by dispersing polystyrene particles each having a diameter of 260 nm (marketed as "Research Polystyrene Particles 5026A"; manufactured by MORITEX Corporation) in water in concentrations of 5% by volume, 10% by volume, 15% by volume, and 20% by volume, respectively. With use of an apparatus configured in the same manner as shown in FIG. 1, except that it does not include particle concentration measuring means or particle concentration adjusting means, particle films each having a size of 30×60 $mm^2$ were formed on the first substrate while moving the first substrate at a film-forming speed of 100 μm/s. The first substrate was a silicon substrate coated with a binder layer.

It should be noted that the silicon substrate coated with the binder layer was prepared as follows: A solution was prepared by dissolving polystyrene (marketed as "Polystyrene"; manufactured by Kishida Chemicals Co., Ltd.) in toluene, and a silicon substrate having a thickness of 0.7 mm was spin-coated with the solution so that the solution formed into a binder layer of polystyrene having a thickness of 200 nm or smaller. Further, the second substrate used was made of ITO glass. The first substrate and the second substrate were placed at a distance of 50 μm from each other, with the second substrate at an angle of 0.14° to the plane of the first substrate.

Figure 3:
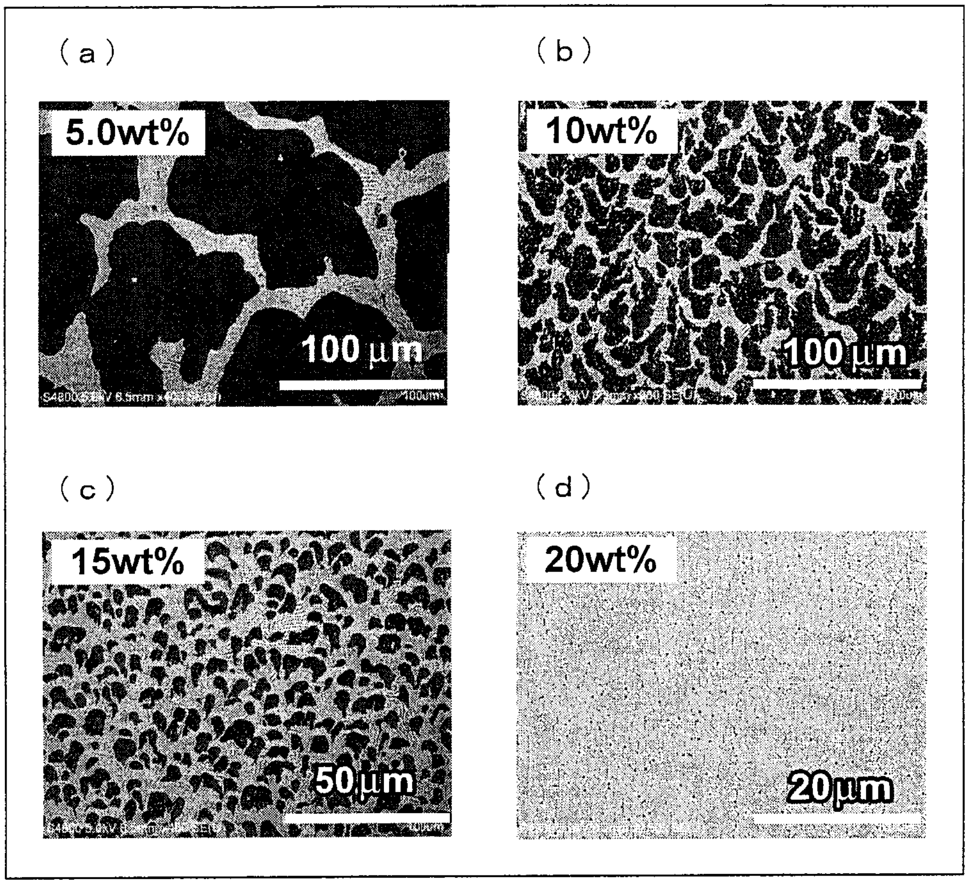
FIG. 3 shows SEM images of particles films obtained in Reference Example 1.
Figure 4:
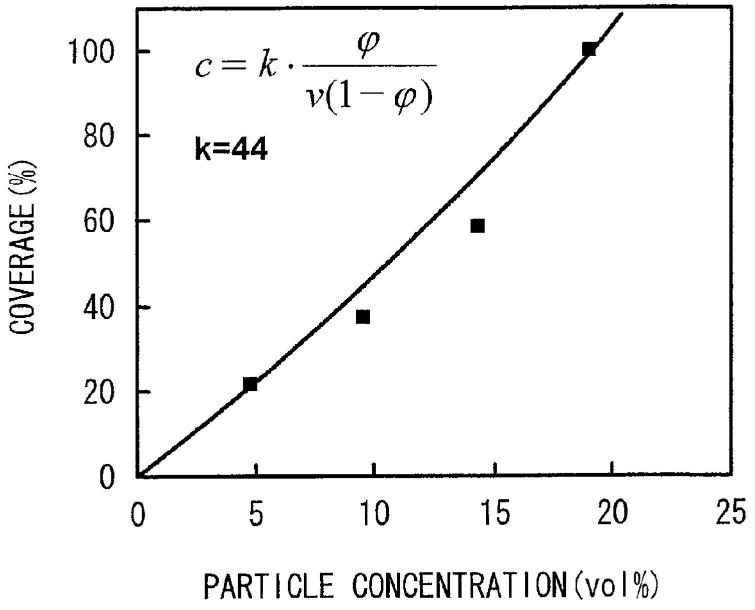
FIG. 4 is a graph showing a relationship between the particle concentration and the coverage as obtained by plotting results obtained in Reference Example 1 and a curve derived from a theoretical expression based on a physical model.

The particle films thus obtained were observed with an SEM, and particle densities were calculated through image processing analysis based on the resulting images. These results are shown in FIGS. 3 and 4. The solid line shown in FIG. 4 is a curve derived from a theoretical expression based on a physical model, and the plot shows experimental results.

As shown in FIG. 4, the experimental results match well with the theoretical expression, and it was confirmed that under such conditions as a diameter of 260 nm and a film-forming speed of 100 μm, the resulting monolayer film is most densely filled with particles when the particle concentration is 20.0% by mass.

Because, as shown in Reference Example 1, the relationship between the change in particle concentration and the coverage of particles as obtained from the theoretical expression based on the physical mode matched well with the experimental values, it was confirmed that a particle monolayer film with a desired coverage can be formed by controlling the concentration of particles in the meniscus area.

Reference Example 2

Dispersion liquids were prepared by dispersing polystyrene particles each having a diameter of 1,000 nm (marketed as "Research Polystyrene Particles 5100A"; manufactured by MORITEX Corporation) in water in concentrations of 1.0% by volume, 2.0% by volume, 3.0% by volume, and 4.0% by volume, respectively. With use of the same apparatus as in Reference Example 1, particle films each having a size of 30×60 $mm^2$ were formed on the first substrate while moving the first substrate at film-forming speeds of 3.0 μm/s, 6.0 μm/s, and 9.0 μm/s, respectively. The first substrate was a silicon substrate coated with a binder layer.

It should be noted that the silicon substrate coated with the binder layer was prepared as follows: A solution was prepared by dissolving polystyrene (marketed as "Polystyrene"; manufactured by Kishida Chemicals Co., Ltd.) in toluene, and a silicon substrate having a thickness of 0.7 mm was spin-coated with the solution so that the solution formed into a binder layer of polystyrene having a thickness of 200 nm or smaller. Further, the second substrate used was made of ITO glass. The first substrate and the second substrate were placed at a distance of 50 μm from each other, with the second substrate at an angle of 0.14° to the plane of the first substrate.

The particle films thus obtained were observed with an SEM, and particle densities were calculated through image processing analysis based on the resulting images. These results are shown in FIG. 4. The solid line shown in FIG. 5 is a curve derived from a theoretical expression based on a physical model, and the plot shows experimental results.

Figure 5:
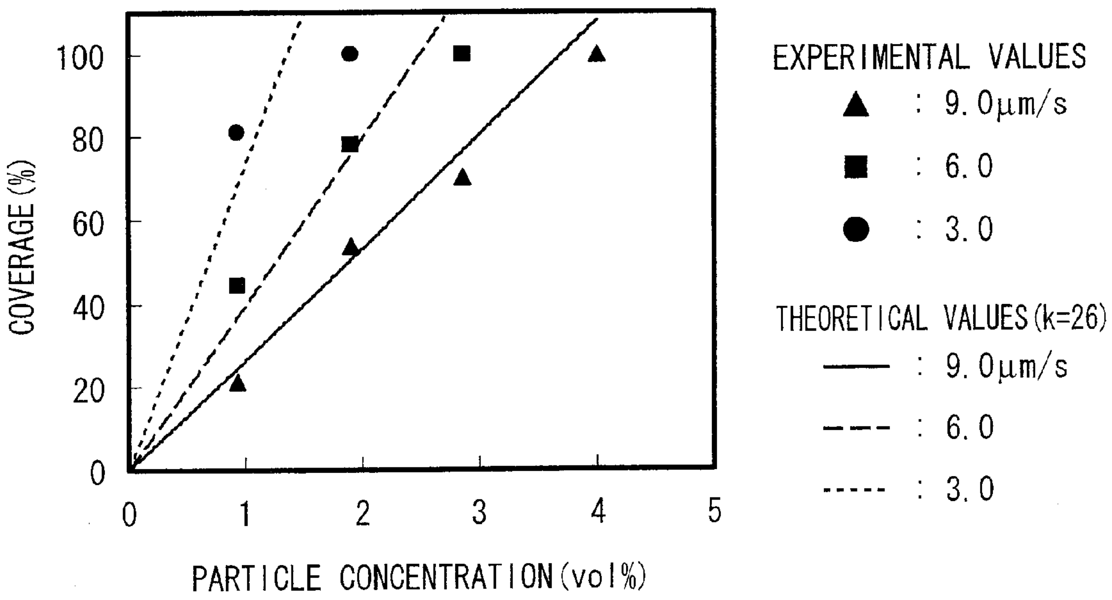
FIG. 5 is a graph showing a relationship between the particle concentration and the coverage as obtained by plotting results obtained in Reference Example 2 and a curve derived from a theoretical expression based on a physical model.

As shown in FIG. 5, the experimental results matched well with the theoretical expression. For this reason, a particle monolayer film with a high coverage can be formed even when the speed at which the substrate moves is changed, provided that the particle concentration is adjusted. Therefore, it was confirmed that a particle monolayer film with a high coverage can be formed with higher productivity.

Reference Example 3

A dispersion liquid was prepared by dispersing polystyrene particles each having a diameter of 1,000 nm (marketed as "Research Polystyrene Particles 5100A"; manufactured by MORITEX Corporation) in a concentration of 40.5% by mass. Under the same conditions as in Reference Example 1, changes in concentration of particles in the process of film formation were traced with use of a capacitance meter (marketed as "Microsense 4800"; manufactured by KLA-Tencor). The results are shown in FIG. 6.

Figure 6:
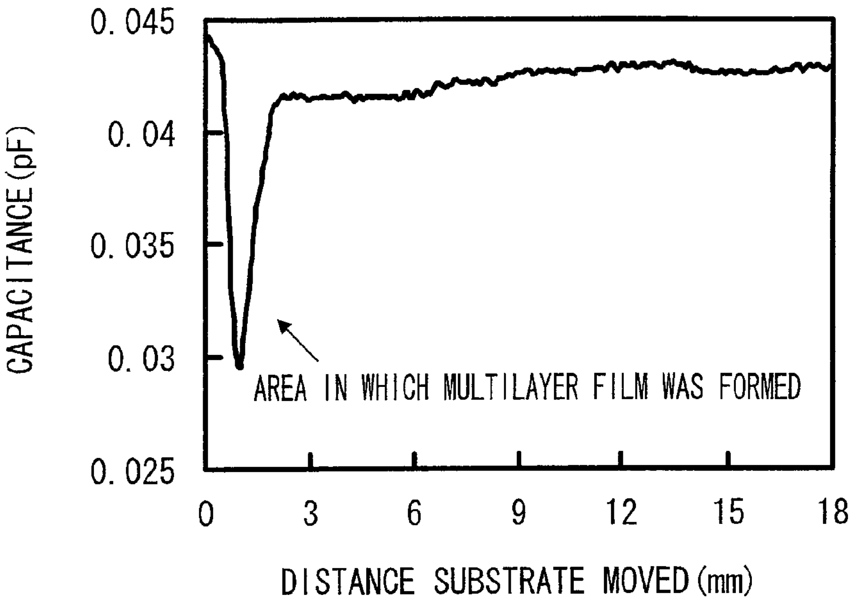
FIG. 6 is a graph showing a relationship between the distance that the substrate moved and the capacitance as obtained in Example 1.

Because, as shown in FIG. 6, an increase in size of an area of film formation leads to a gradual increase in value of capacitance, it was confirmed that an increase in size of an area of film formation leads to a decrease in concentration of polystyrene particles in the meniscus area. It should be noted here that as a result of SEM measurement of the state of a film in an area where a decrease in capacitance was found, it was confirmed that a monolayer film filled with particles at a low density had been formed.

Reference Example 4

A dispersion liquid was prepared by dispersing Au particles each having a diameter of 15 nm in water in a concentration of 5.0% by mass. The Au particles were synthesized by a method described in *Japanese Journal of Applied Physics* 2001, 40, 346-349. With use of an apparatus configured in the same manner as shown in FIG. 1, except that it does not include particle concentration measuring means, particle films each having a size of 30×60 $mm^2$ were formed on the first substrate while moving the first substrate at a film-forming speed of 1.25 μm/s and applying electric fields of 0 V/cm, 60 V/cm, and 100 V/cm between the substrates, respectively. The first substrate was a silicon substrate coated with a binder layer.

It should be noted that the silicon substrate coated with the binder layer was prepared as follows: A solution was prepared by dissolving polystyrene (marketed as "Polystyrene"; manufactured by Kishida Chemicals Co., Ltd.) in toluene, and a silicon substrate having a thickness of 0.7 mm was spin-coated with the solution so that the solution formed into a binder layer of polystyrene having a thickness of 20 nm or smaller. Further, the second substrate used was made of ITO glass. The first substrate and the second substrate were placed at a distance of 50 μm from each other, with the second substrate at an angle of 0.14° to the plane of the first substrate.

Figure 7:
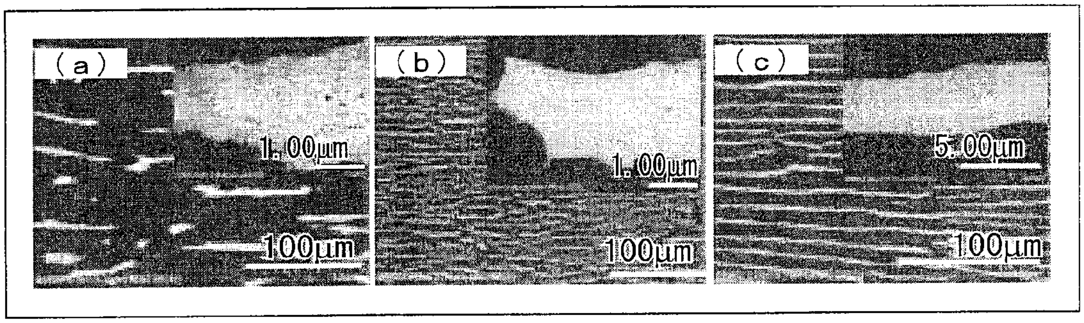
FIG. 7 shows SEM images of particle films obtained in Reference Example 3.

The results are shown in Table 1 and FIG. 7. In the result, it was confirmed that an increase in magnitude of the electric field applied leads to an increase in density of the particle film to be formed. Therefore, it was confirmed that the concentration of particles in the meniscus area can be controlled by applying an electric field between the substrates.

TABLE 1

| Electric fields applied (V/cm) | Pattern shapes | Types of nanoparticle array |
|---|---|---|
| 0 | Parallel to direction of operation | Monolayer |
| 60 | Parallel to direction of operation | Monolayer |
| 100 | Parallel to direction of operation, linear, high in density, continuous | Monolayer |

Example 1

A dispersion liquid was prepared by dispersing Au particles each having a diameter of 15 nm in water in a concentration of 1% by mass. The dispersion liquid is identical to that used in Reference Example 4. With use of an apparatus configured in the same manner as shown in FIG. 1, particle films each having a size of 30×60 $mm^2$ were formed on the first substrate while moving the first substrate at a film-forming speed of 0.1 mm/s and applying electric fields of 100 V/cm, 60 V/cm, and 0 V/cm stepwise between the substrates, respectively. The first substrate was a silicon substrate coated with a binder layer. It should be noted that the silicon substrate coated with the binder layer was prepared as follows: A solution was prepared by dissolving polystyrene (marketed as "Polystyrene"; manufactured by Kishida Chemicals Co., Ltd.) in toluene, and a silicon substrate having a thickness of 0.7 mm was spin-coated with the solution so that the solution formed into a binder layer of polystyrene having a thickness of 20 nm or smaller.

Figure 8:
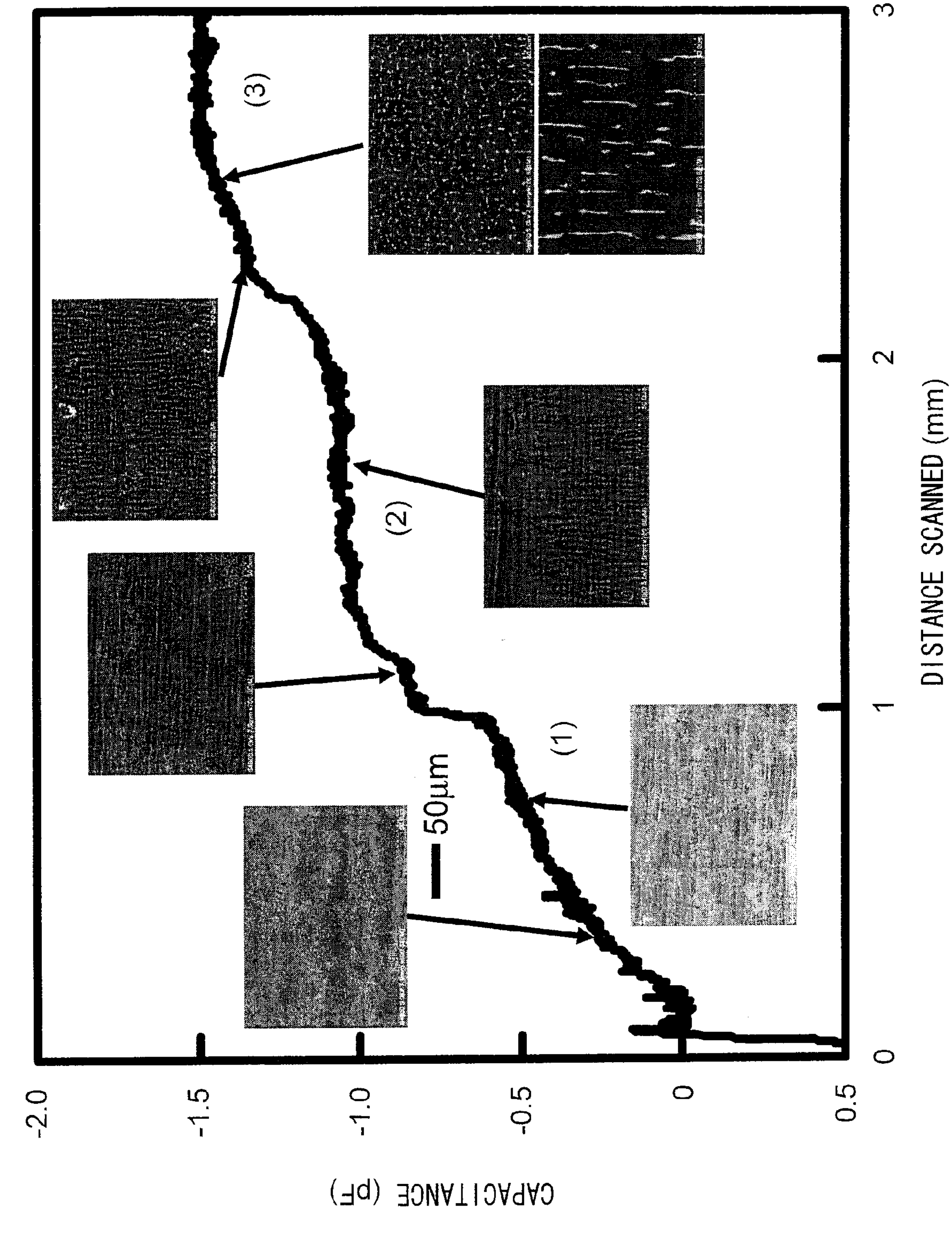
FIG. 8 is a graph showing a relationship between the distance scanned and the capacitance as obtained in Example 2.

The results are shown in FIG. 8. In FIG. 8, the vertical axis represents capacitance, which takes on smaller values as it goes up. Further, the horizontal axis represents position information of the substrate during film formation.

As shown in FIG. 8, at the start of film formation, first, a voltage of 100 V/cm was applied (see Area 1 in FIG. 8). After that, the applied voltage was lowered from 100 V/cm to 60 V/cm, which results in a significant decrease in capacitance (see Area 2 in FIG. 8). Then, finally, the applied voltage was lowered to 0 V/cm, which resulted, similarly, in a significant decrease in capacitance (see Area 3 in FIG. 8).

As above, it was confirmed that the value of capacitance to be measured in the meniscus area can be controlled by changing the magnitude of the applied voltage. It should be noted that although there is a slight change in capacitance immediately after the application of each voltage, the capacitance gradually reached a steady state.

Further, for the purpose of confirming that the density of particles from which a film is formed can be controlled by a change in capacitance, the monolayer films were measured with an SEM in each area (see FIG. 8). In the result, it was confirmed that the particles films thus obtained had different film densities corresponding to different values of capacitance.

It should be noted that in each SEM image shown in FIG. 8, the upward direction is the direction in which the substrate was scanned. Further, the legend "–50 μm" in FIG. 8 indicates a scale in each SEM photograph.

Example 2

Creation of a Database

Figure 15:
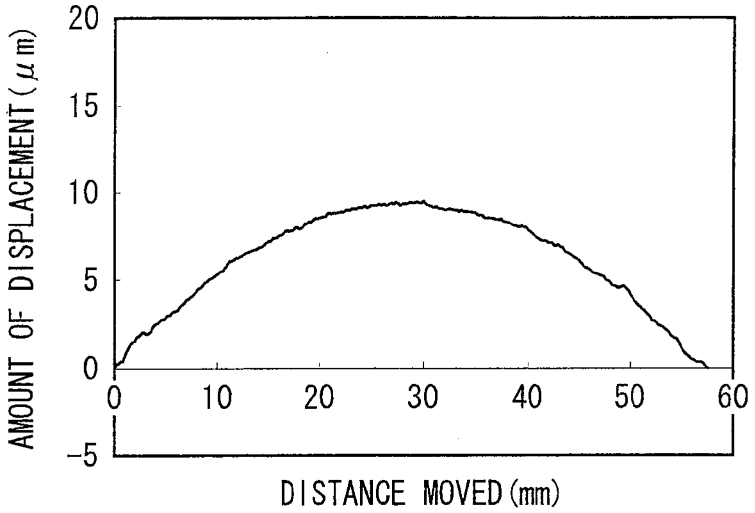
FIG. 15 is a graph showing capacitance changes based solely on bending of the first substrate as measured in Example 2.

An apparatus configured in the same manner as shown in FIG. 1 was used. As the first substrate, a silicon wafer (cut wafer) cut out into a size of 30×60 $mm^2$ was used. The cut wafer was fixed to the apparatus by vacuum chucking. A cylindrical capacitance probe (marketed as "2810"; manufactured by KLA-Tencor) whose sensing area has a diameter of 10 mm was fixed at a height of 1.03 mm vertically above a surface of the silicon wafer from the middle of a short side of the cut wafer. Moreover, a stepping motor was used to move only the first substrate at a speed of 1,000 μm/s uniaxially along a long side (X axis) of the cut wafer. The results are shown in FIG. 15.

Figure 16:
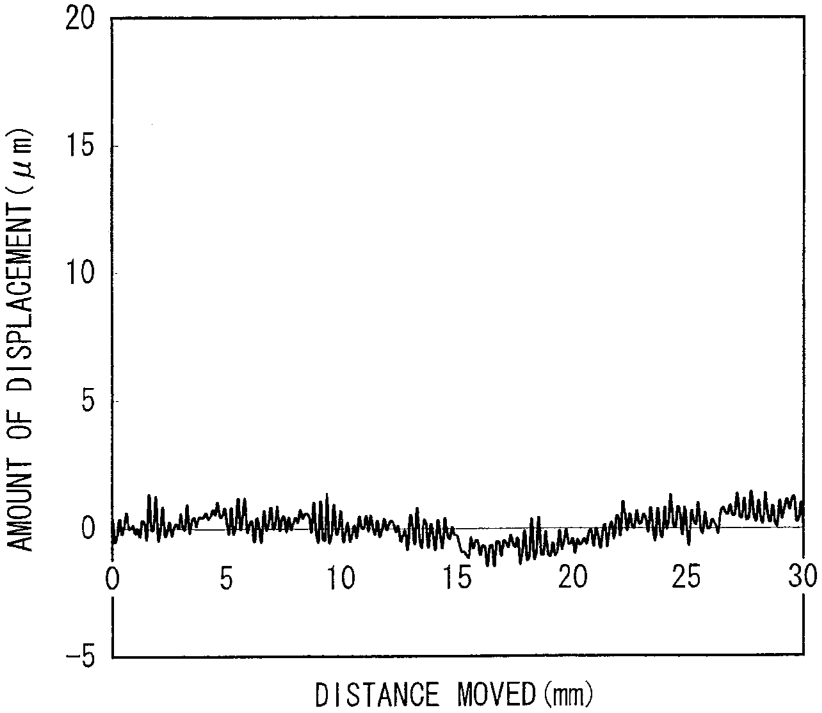
FIG. 16 is a graph showing measured capacitance values corrected so that capacitance changes based solely on bending of the first substrate in the graph of FIG. 15 are cut to zero.

At this point in time, a database of capacitance changes based solely on bending of the substrate was created, with a pitch of measurement of 10 times/second. Moreover, the measured capacitance values were corrected with use of the obtained data so that capacitance changes based solely on bending of the substrate were cut to substantially zero as shown in FIG. 16.

[Measurement of Change in Nanoparticle Concentration]

An aqueous solution containing 5% by weight of gold nanoparticles each having a diameter of 12 nm was introduced into a space between the first substrate (silicon wafer) and the second substrate (quartz). The gold particles were synthesized by a method described in *Japanese Journal of Applied Physics* 2001, 40, 346-349. As in the experiments above, only the first substrate was scanned uniaxially at a speed of 1,000 μm/s.

At this point in time, the nanoparticle concentration was obtained by correcting the measured capacitance values, with use of the prepared database of capacitance changes based solely on bending of the first substrate, so that capacitance changes based solely on bending of the substrate were cut to zero. It should be noted the pitch of measurement was 10 times/second.

Moreover, based on the nanoparticle concentration thus obtained, a dispersion aqueous solution containing 5% by weight of nanoparticles was fed continuously at a speed of 12 L/h with use of a syringe pump so that there were substantially no changes in nanoparticle concentration.

Figure 17:
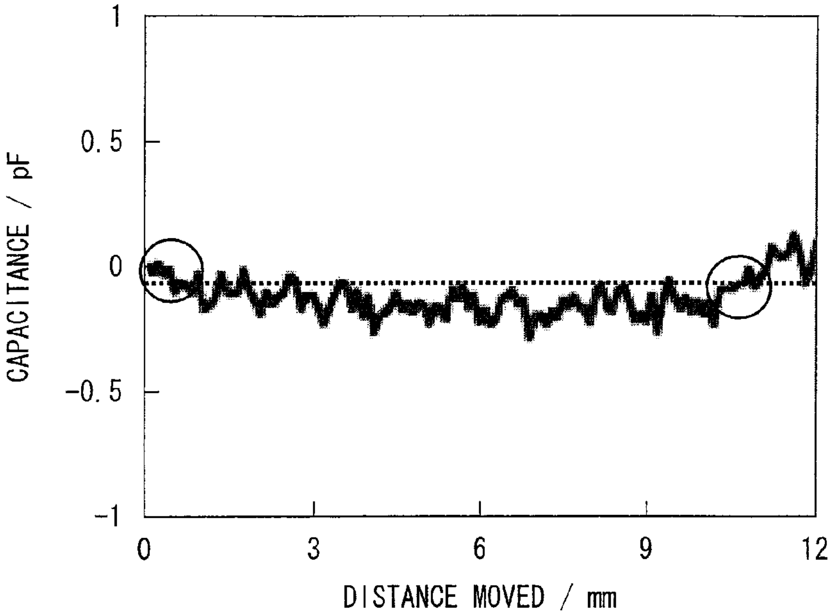
FIG. 17 is a graph showing a relationship between the distance that the first substrate was scanned and the capacitance in the meniscus area during film formation in Example 2.
Figure 18:
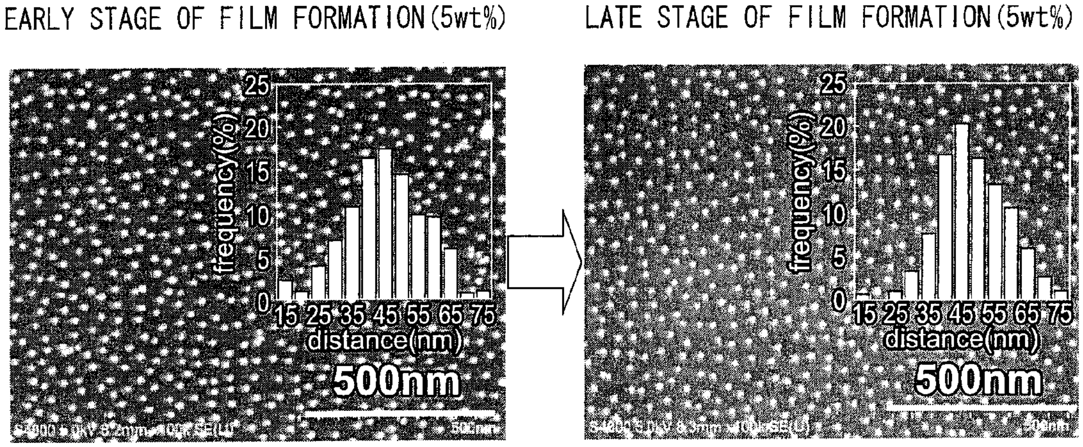
FIG. 18 shows a distribution of distance between particles during film formation in Example 2.

In the result, as shown in FIG. 17, the concentration of particles in the meniscus area was able to be held constant across the whole distance scanned. Further, as shown in FIG. 18, the particles in the particle film thus obtained were at very short distances from one another. Therefore, it was confirmed that a uniform particle film can be produced by a method and apparatus according to the present invention.

It should be noted that a graph of the distribution of particle density as shown in FIG. 18 is one obtained by inference from the SEM data obtained.

Comparative Example 1

A particle film was produced by carrying the operation as in Example 2, except that a dispersion aqueous solution containing 5% by weight of nanoparticles was not fed with use of a syringe pump, so that there were substantially no changes in nanoparticle concentration.

Figure 19:
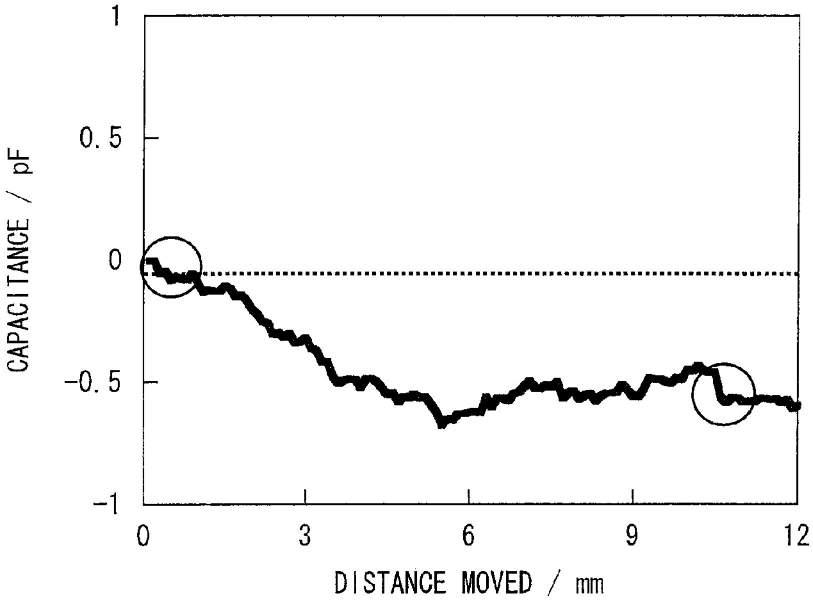
FIG. 19 is a graph showing a relationship between the distance that the first substrate was scanned and the capacitance in the meniscus area during film formation in Comparative Example 1.

In the result, as shown in FIG. 19, it was confirmed that an increase in distance scanned leads to a decrease in capacitance in the meniscus area and therefore a decrease in particle concentration.

Further, as shown in FIG. 2, as the concentration of particles in the meniscus area decreased, the density of the particle film to be formed also decreased. This was a particle density corresponding to that of a film formed with use of a dispersion aqueous solution containing 3.7% by weight of particles.

Figure 20:
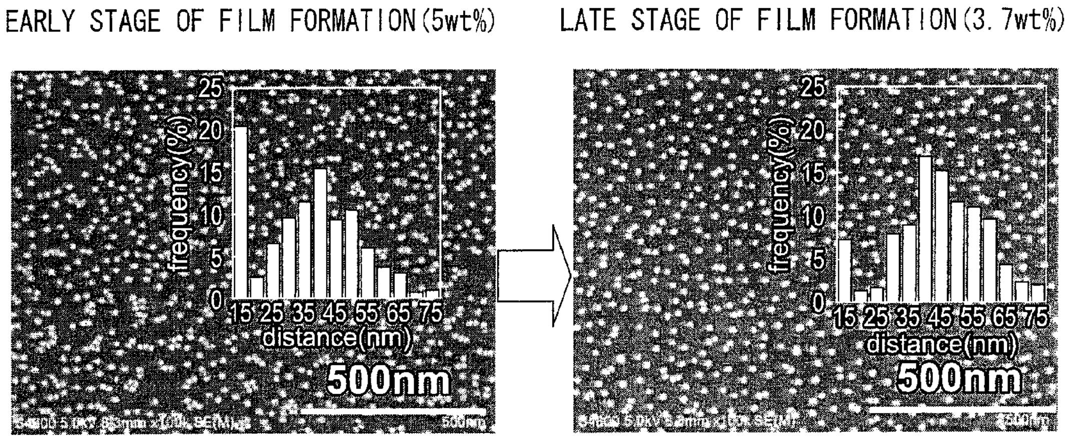
FIG. 20 shows a distribution of distance between particles during film formation in Comparative Example 1.

It should be noted that a graph of the distribution of particle density as shown in FIG. 20 is one obtained by inference from the SEM data obtained.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

A method of the present invention for producing a particle film can form a particle film uniformly even on a substrate of a practical size. As such, the method can be suitably used for various purposes that require the formation of a particle film on a substrate.

REFERENCE EXAMPLE SIGNS LIST

1 First substrate
2 Second substrate
3 Particle concentration measuring means
4 Particle dispersion liquid
5 Meniscus area
6 Bending measuring means
7 Initial condition setting means
11 Substrate placing means
12 Substrate moving means
13 Particle concentration adjusting means
14 Substrate speed varying means
15 Electric field applying means
16 Particle dispersion liquid feeding means
20 Apparatus for producing a particle film
20' Apparatus for producing a particle film
20" Apparatus for producing a particle film

The invention claimed is:

1. An apparatus for producing a particle film by sweeping a meniscus area in a particle dispersion liquid filling a space between a first substrate and a second substrate facing the first substrate and by forming the particle film on the first substrate while evaporating a solvent in the meniscus area, the apparatus comprising:

particle concentration measuring capacitance meter for measuring a concentration of particles in the meniscus area, wherein the particle concentration measuring capacitance meter includes a sensor probe that is used to measure capacitance in the meniscus area in a noncontact manner and determine particle concentration from the capacitance;

a device configured to adjust the concentration of particles in the meniscus area by applying a direct-current electric field between the first substrate and the second substrate in accordance with the particle concentration measured with the particle concentration measuring capacitance meter, wherein the device adjusts the concentration of particles in the meniscus area by controlling a speed at which the first substrate changes from one position to another, wherein the following formula is utilized to determine coverage of the particles in the meniscus area: $(c=k\times\psi/(v(1-\psi)))$, where c is the coverage, k is a constant, $\Psi$ is the concentration of particles in the dispersion liquid (% by volume), and v is the speed at which the first substrate moves (μm/s), and a capacitive displacement meter provided with a sensor probe for measuring a degree of bending of the first substrate from a value of capacitance formed between the sensor probe and the first substrate, wherein the particle concentration measuring capacitance meter determines the particle concentration in accordance with the degree of bending measured by the capacitive displacement meter provided with a sensor probe, in addition to the capacitance in the meniscus area.

2. The apparatus as set forth in claim 1, wherein the particle film is a monoparticle film.

3. The apparatus as set forth in claim 1, wherein the particle concentration measuring capacitance meter includes a sensor probe that is used to measure capacitance in the meniscus area in a noncontact manner and determine, from the capacitance, the concentration of particles in a situation where the solvent in the meniscus area evaporates.

4. The apparatus as set forth in claim 1, wherein the sensor probe and a portion of the first substrate that includes the meniscus area is at a distance of 200 μm to 3,000 μm from each other.

* * * * *